US011899394B2

(12) United States Patent
Sato

(10) Patent No.: US 11,899,394 B2
(45) Date of Patent: Feb. 13, 2024

(54) IMAGE-FORMING APPARATUS PROVIDED WITH URGING MEMBER FOR URGING PROCESS CARTRIDGE

(71) Applicant: Brother Kogyo Kabushiki Kaisha, Nagoya (JP)

(72) Inventor: Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/164,099

(22) Filed: Feb. 3, 2023

(65) Prior Publication Data

US 2023/0185233 A1 Jun. 15, 2023

Related U.S. Application Data

(63) Continuation of application No. 17/475,575, filed on Sep. 15, 2021, now Pat. No. 11,579,562, which is a continuation of application No. 16/928,506, filed on Jul. 14, 2020, now Pat. No. 11,137,715, which is a continuation of application No. 16/727,479, filed on (Continued)

(30) Foreign Application Priority Data

Mar. 30, 2015 (JP) ................................ 2015-070127

(51) Int. Cl.
*G03G 21/18* (2006.01)
*G03G 15/08* (2006.01)
*G03G 21/10* (2006.01)

(52) U.S. Cl.
CPC ..... *G03G 21/1814* (2013.01); *G03G 15/0879* (2013.01); *G03G 21/185* (2013.01); *G03G 21/10* (2013.01); *G03G 2215/0132* (2013.01)

(58) Field of Classification Search
CPC .......... G03G 21/1619; G03G 21/1814; G03G 15/0879; G03G 21/185; G03G 21/10; G03G 2215/0132; G03G 15/0865; G03G 21/105
See application file for complete search history.

(56) References Cited

U.S. PATENT DOCUMENTS 7,486,910 B2 2/2009 Kitozaki
9,678,470 B2 6/2017 Sato
(Continued)

FOREIGN PATENT DOCUMENTS

JP 2008170944 A 7/2008

*Primary Examiner* — Sandra Brase
(74) *Attorney, Agent, or Firm* — Banner & Witcoff, Ltd.

(57) ABSTRACT

An image-forming apparatus includes: a main body; a toner cartridge having a first opening; a process cartridge having a photosensitive drum and a second opening; a positioning part; a transfer unit; and an urging member. The toner cartridge and process cartridge are attachable to and detachable from the main body in an axial direction of the photosensitive drum. The positioning part and transfer unit are positioned above the process cartridge attached to the main body. The positioning part fixes the attached process cartridge in position relative to the main body. The urging member urges the attached process cartridge toward the positioning part and urges the process cartridge such that the toner can be supplied from the toner cartridge to the process cartridge through the first opening and the second opening when the toner cartridge and the process cartridge are attached to the main body.

10 Claims, 10 Drawing Sheets

Related U.S. Application Data

Dec. 26, 2019, now Pat. No. 10,732,567, which is a continuation of application No. 16/279,322, filed on Feb. 19, 2019, now Pat. No. 10,551,792, which is a continuation of application No. 15/875,746, filed on Jan. 19, 2018, now Pat. No. 10,248,079, which is a continuation of application No. 15/589,267, filed on May 8, 2017, now Pat. No. 9,904,241, which is a continuation of application No. 15/065,967, filed on Mar. 10, 2016, now Pat. No. 9,678,470.

(56) References Cited

U.S. PATENT DOCUMENTS

| | | | | |
|---|---|---|---|---|
| 9,904,241 | B2 | 2/2018 | Sato | |
| 10,248,079 | B2 | 4/2019 | Sato | |
| 10,732,567 | B2 | 8/2020 | Sato | |
| 2005/0036810 | A1 | 2/2005 | Murakami et al. | |
| 2005/0207797 | A1 | 9/2005 | Fujita et al. | |
| 2007/0223947 | A1 | 9/2007 | Ohkawa et al. | |
| 2008/0118290 | A1* | 5/2008 | Sato | G03G 21/105 399/358 |
| 2008/0138115 | A1 | 6/2008 | Chadani et al. | |
| 2008/0159772 | A1 | 7/2008 | Koishi et al. | |
| 2009/0162096 | A1* | 6/2009 | Sakuma | G03G 15/0879 399/119 |
| 2010/0239340 | A1 | 9/2010 | Akaike et al. | |
| 2010/0296832 | A1 | 11/2010 | Andou | |
| 2011/0236054 | A1 | 9/2011 | Mori et al. | |
| 2012/0328325 | A1 | 12/2012 | Sato | |
| 2013/0251433 | A1 | 9/2013 | Toshiyuki | |
| 2013/0272750 | A1* | 10/2013 | Matsumoto | G03G 15/0879 399/262 |
| 2013/0294798 | A1 | 11/2013 | Takiguchi et al. | |
| 2014/0010579 | A1 | 1/2014 | Yoshino et al. | |
| 2014/0270821 | A1 | 9/2014 | Takahashi | |
| 2016/0274484 | A1 | 9/2016 | Iikura et al. | |
| 2016/0282756 | A1 | 9/2016 | Awano | |

* cited by examiner

IMAGE-FORMING APPARATUS PROVIDED WITH URGING MEMBER FOR URGING PROCESS CARTRIDGE

CROSS REFERENCE TO RELATED APPLICATION

This application is a continuation of prior U.S. application Ser. No. 17/475,575, filed on Sep. 15, 2021, which is a continuation of prior U.S. application Ser. No. 16/928,506, filed on Jul. 14, 2020 (now U.S. Pat. No. 11,137,715, issued Oct. 5, 2021), which is a continuation of prior U.S. application Ser. No. 16/727,479, filed on Dec. 26, 2019 (now U.S. Pat. No. 10,732,567, issued Aug. 4, 2020), which is a continuation of prior U.S. application Ser. No. 16/279,322, filed Feb. 19, 2019 (now U.S. Pat. No. 10,551,792, issued Feb. 4, 2020), which is a continuation of prior U.S. application Ser. No. 15/875,746, filed Jan. 19, 2018 (now U.S. Pat. No. 10,248,079, issued Apr. 2, 2019), which is a continuation of prior U.S. application Ser. No. 15/589,267, filed May 8, 2017 (now U.S. Pat. No. 9,904,241, issued Feb. 27, 2018), which is a continuation of prior U.S. application Ser. No. 15/065,967, filed Mar. 10, 2016 (now U.S. Pat. No. 9,678,470 issued Jun. 13, 2017), which claims priority from Japanese Patent Application No. 2015-070127 filed Mar. 30, 2015. The entire contents of the priority applications are incorporated herein by reference.

TECHNICAL FIELD

The present disclosure relates to an electro-photographic type image-forming apparatus.

BACKGROUND

There has been known an image-forming apparatus provided with a process cartridge to be attached to and detached from a main housing.

Japanese Patent Application Publication No. 2008-170944 discloses an image-forming apparatus provided with a process cartridge including a drum unit and a developing unit. The drum unit includes a photosensitive drum, and the developing unit is positioned to oppose the drum unit. The process cartridge is attachable to and detachable from a main housing with respect to an axial direction of the photosensitive drum.

SUMMARY

In view of the foregoing, it is an object of the present disclosure to provide an improved image-forming apparatus.

In order to attain the above and other objects, the disclosure provides an image-forming apparatus including a main body, a toner cartridge, a process cartridge, a positioning part, a transfer unit and an urging member. The toner cartridge is attachable to and detachable from the main body, the toner cartridge accommodating toner therein and having a first opening. The process cartridge includes a photosensitive drum configured to carry a toner image thereon, the photosensitive drum defining an axis extending in an axial direction, the process cartridge being attachable to and detachable from the main body in the axial direction, the process cartridge having a second opening. The positioning part is positioned above the process cartridge attached to the main body, the positioning part being configured to fix the process cartridge in position relative to the main body when the process cartridge is attached to the main body. The transfer unit is positioned above the process cartridge attached to the main body, the toner image on the photosensitive drum being configured to be transferred to the transfer unit when the process cartridge is attached to the main body. The urging member is configured to urge the process cartridge toward the positioning part when the process cartridge is attached to the main body, the urging member being configured to urge the process cartridge such that the toner can be supplied from the toner cartridge to the process cartridge through the first opening and the second opening when the toner cartridge and the process cartridge are attached to the main body.

BRIEF DESCRIPTION OF THE DRAWINGS

The particular features and advantages of the disclosure as well as other objects will become apparent from the following description taken in connection with the accompanying drawings, in which.

DETAILED DESCRIPTION

1. Overall Structure of the Printer

A printer 1 as an example of an image-forming apparatus according to a first embodiment will be described while referring to FIGS. 1 through 8.

Figure 1:
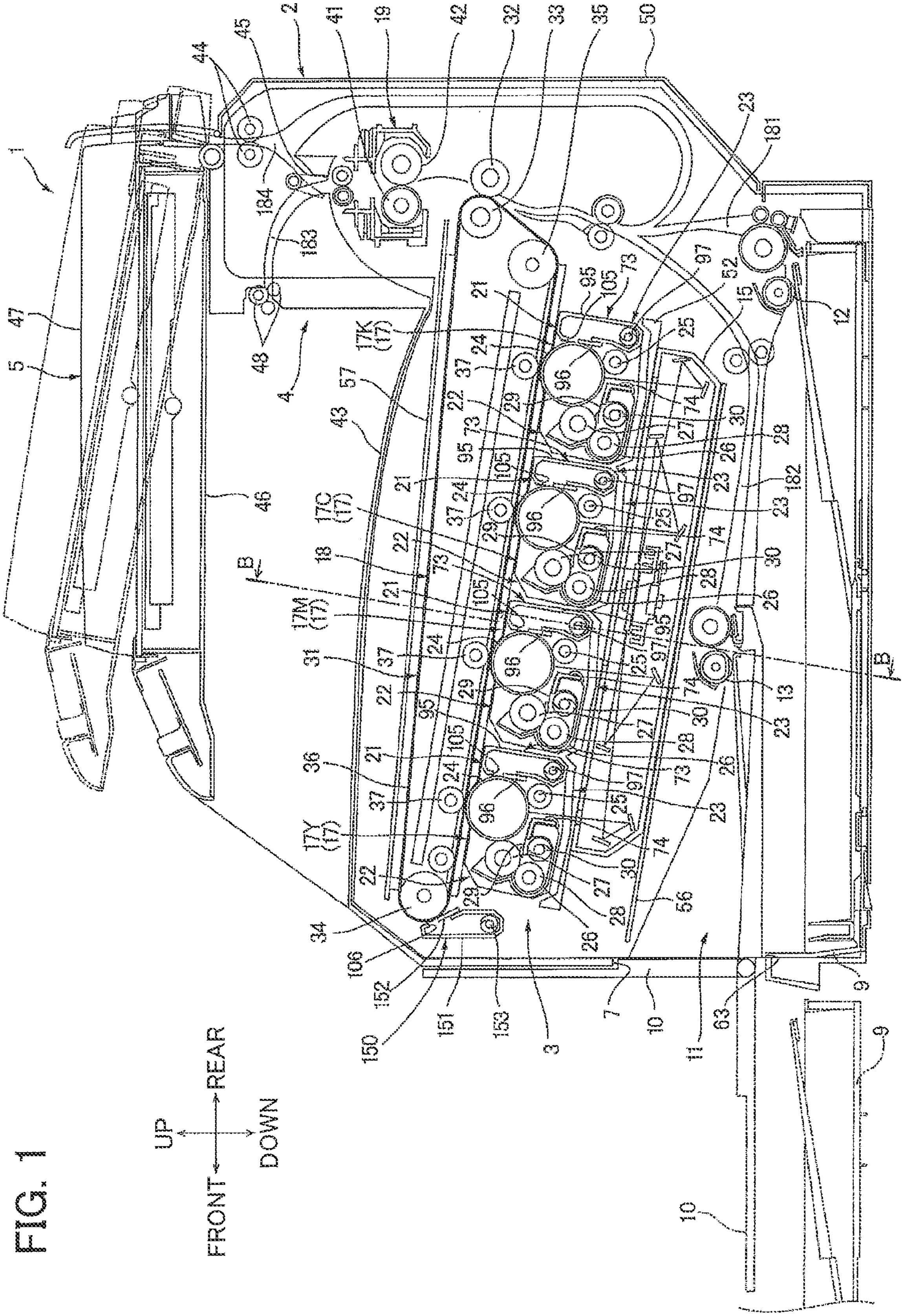
FIG. 1 is a central cross-sectional view of a printer as an example of an image-forming apparatus according to a first embodiment.

As shown in FIG. 1, the printer 1 includes a main casing 2, a sheet-supplying unit 11 for supplying a sheet, an image-forming unit 3 for forming an image on the sheet, a sheet-discharging unit 4 for discharging the image-formed sheet, and an image-reading unit 5 for reading image data on an original document.

Figure 6:
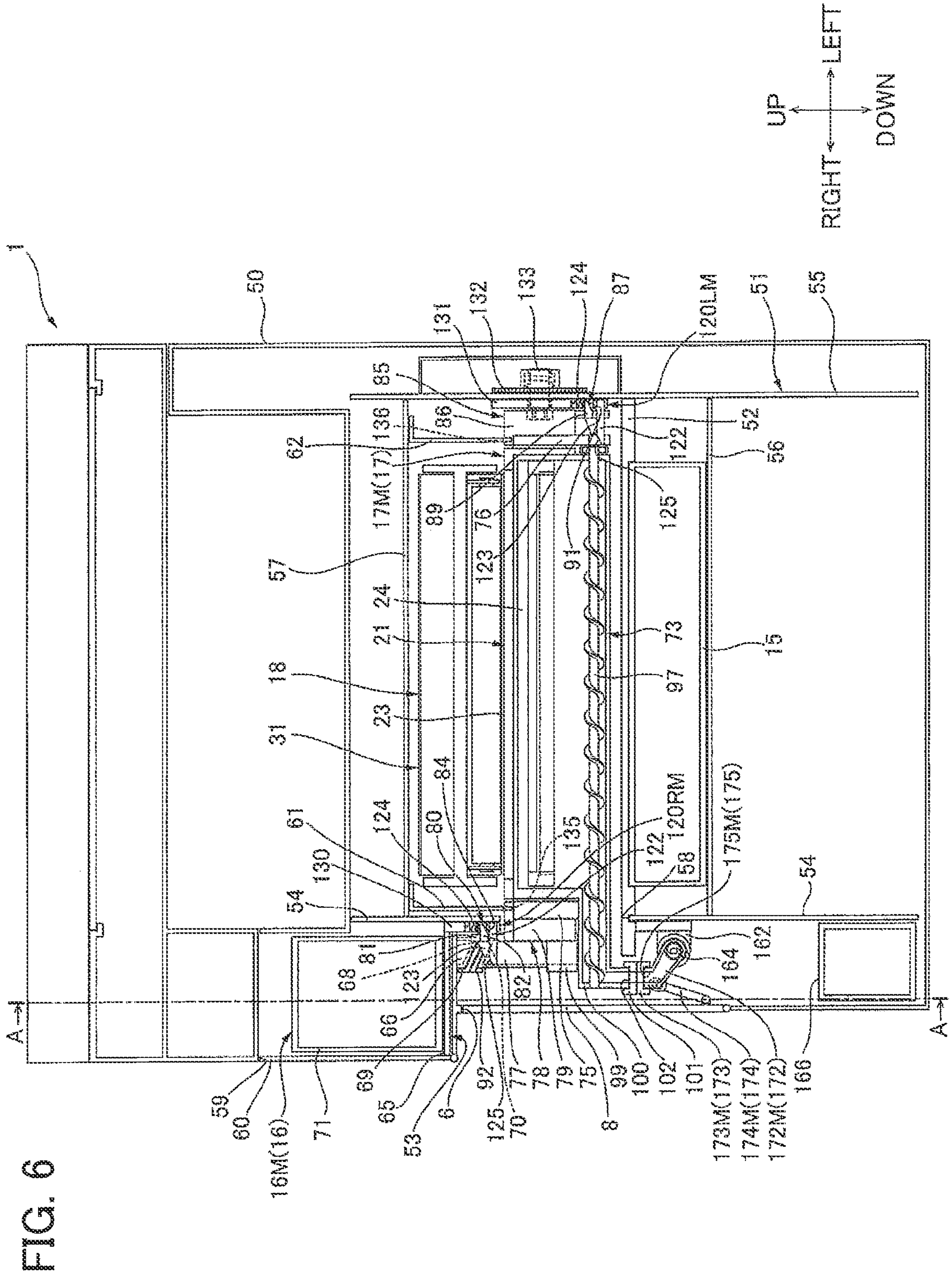
FIG. 6 is a cross-sectional view of the printer according to the first embodiment taken along a line B-B shown in FIG. 1, and showing a state where the process cartridge is at its first position and a connector tube is at its communication position.

The main casing 2 is generally box-shaped, and includes an outer frame 50 and an inner frame 51 provided within the outer frame 50, as shown in FIG. 6.

The outer frame 50 includes a front wall, a rear wall, an upper wall, a right wall and a left wall which constitute a front wall, a rear wall, an upper wall, a right wall and a left wall of the main casing 2. The front wall of the outer frame 50 is formed with an access opening 7 and another access opening 63 for allowing communication between the inside and the outside of the main casing 2 in a front-rear direction. Structures of the outer frame 50 and inner frame 51 will be described later in greater detail.

The sheet-supplying unit 11 includes a first sheet tray 9, a first pick-up roller 12, a second sheet tray 10, and a second pick-up roller 13.

The first sheet tray 9 is positioned at a lower end portion of an interior of the main casing 2. The first sheet tray 9 is generally box shaped having an upper open end, and is detachably attachable to the main casing 2. The first sheet tray 9 is configured to accommodate sheets.

The first pick-up roller 12 is positioned above a rear end portion of the first sheet tray 9. The first pick-up roller 12 is generally cylindrical extending in a left-right direction, and is rotatably supported to the main casing 2.

The second sheet tray 10 is provided at the front wall of the main casing 2 (i.e., outer frame 50). The second sheet tray 10 is a flat plate-like shape having a generally rectangular shape in a front view. The second sheet tray 10 has a lower end pivotally connected to the front wall, so that the second sheet tray 10 is pivotally movable about the lower end between a closed position closing the access opening 7 (shown by a sloid line in FIG. 1) and an open position opening the access opening 7 (shown by a phantom line in FIG. 1). When placed at the open position, the second sheet tray 10 serves as a sheet receiving tray on which sheets for manual insertion are placed.

The second pick-up roller 13 is positioned rearward of the second sheet tray 10 and at a generally center portion of the main casing 2 in the front-rear direction. The second pick-up roller 13 has a generally cylindrical shape extending in the left-right direction. The second pick-up roller 13 is rotatably supported to the main casing 2.

The sheet-supplying unit 11 also includes: a first sheet-feeding path 181 along which a sheet is configured to be fed by the first pick-up roller 12 from the first sheet tray 9; and a second sheet-feeding path 182 along which a sheet is configured to be fed by the second pick-up roller 13 from the second sheet tray 10.

Figure 2:
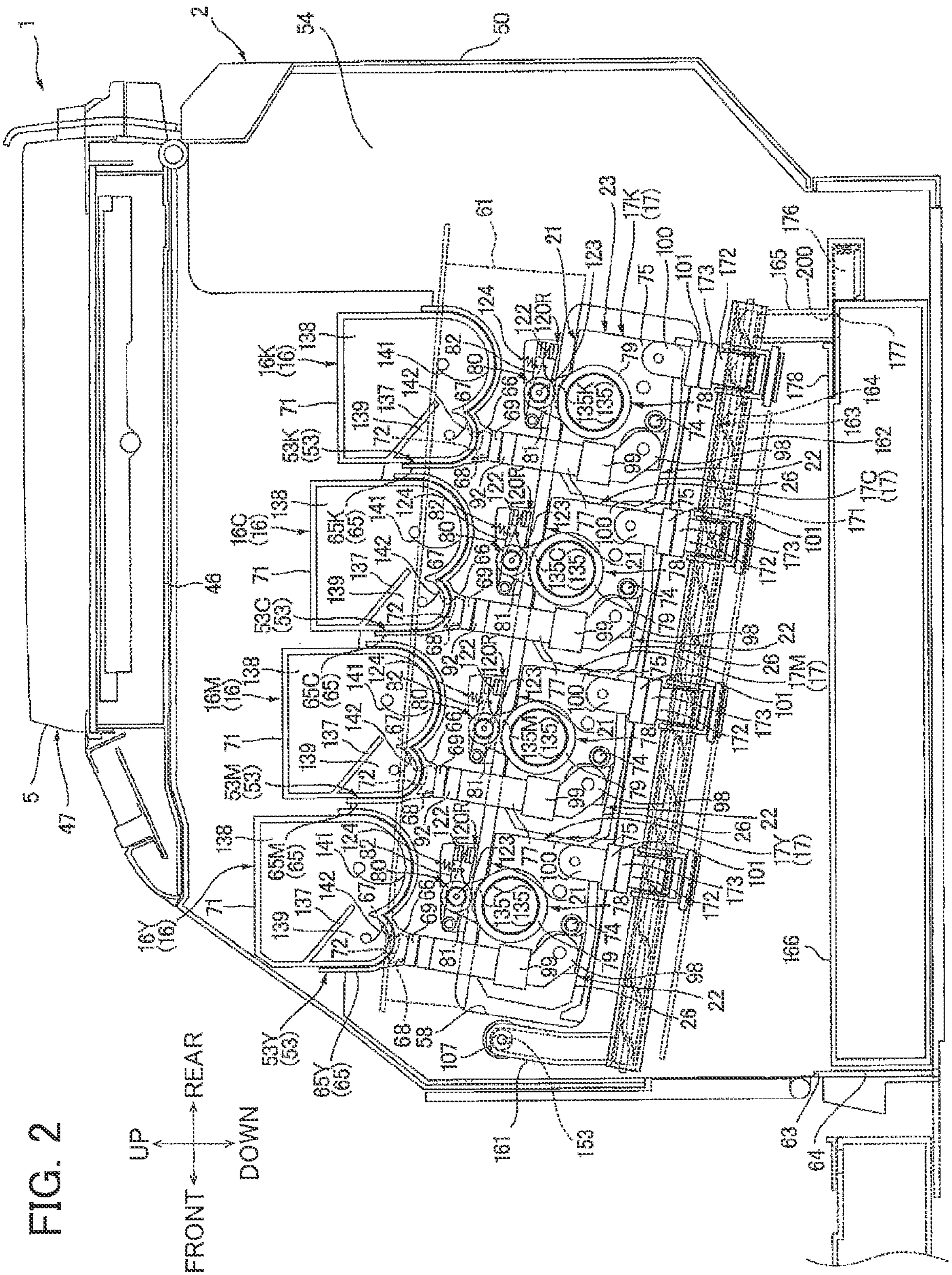
FIG. 2 is a cross-sectional view of the printer according to the first embodiment taken along a line A-A of FIG. 6.

As shown in FIGS. 1 and 2, the image-forming unit 3 includes toner cartridges 16Y, 16M, 16C and 16K, process cartridges 17Y, 17M, 17C and 17K, a scanner unit 15, a transfer unit 18, and a fixing unit 19. In the following description Y, M, C and K represent toners of yellow, magenta, cyan, and black, respectively. Further, in the drawings, reference characters of Y, M, C and K are added only for typical components, for explanatory purpose.

As shown in FIG. 6, the toner cartridges 16Y, 16M, 16C and 16K are positioned at right upper end portion of the interior of the main casing 2. As shown in FIG. 2, the toner cartridges 16Y, 16M, 16C and 16K are arrayed and spaced apart from one another in a diagonal direction from an upper front portion toward a lower rear portion of the main casing 2. The toner cartridges 16Y, 16M, 16C and 16K are detachably attached to the main casing 2, and contain therein toners of different colors of yellow, magenta, cyan, and black, respectively. The toner cartridges 16Y, 16M, 16C and 16K have the same structures as one another.

As shown in FIG. 1, the process cartridges 17Y, 17M, 17C and 17K are positioned at a generally center in the main casing 2. The process cartridges 17Y, 17M, 17C and 17K are arrayed in the diagonal direction from the upper front upper to the lower rear with a space between neighboring cartridges. The process cartridges 17Y, 17M, 17C and 17K are attached to and detached from the main casing 2 with respect to the left-right direction. Specifically, the process cartridges 17Y, 17M, 17C and 17K are attached to the main casing 2 in a leftward direction (from the right to the left), while being detached from the main casing 2 in a rightward direction (from the left to the right). The leftward direction is an example of an attaching direction. As shown in FIGS. 2 and 6, each of the process cartridges 17Y, 17M, 17C and 17K is positioned leftward and downward of the corresponding one of the toner cartridges 16Y, 16M, 16C and 16K when mounted in the main casing 2.

Incidentally, the process cartridges 17Y, 17M, 17C and 17K have identical structures to each other. Therefore, in the following, the structure of the process cartridge 17K will only be described.

As shown in FIG. 1, the process cartridge 17K includes a drum unit 21K and a developing unit 22K.

The drum unit 21K includes a photosensitive drum 24K and a charging roller 25K.

The photosensitive drum 24K is provided in an upper end portion of the drum unit 21K. The photosensitive drum 24K is generally cylindrical and extends in the left-right direction. The photosensitive drum 24K is rotatably supported to a drum-unit frame 23K (described later) of the drum unit 21K. The photosensitive drum 24K defines an axis extending in the left-right direction about which the photosensitive drum 24K is rotatable.

The charging roller 25K is positioned downward of the photosensitive drum 21K, and is generally cylindrical shaped extending in the left-right direction. The charging roller 25K is rotatably supported to the drum-unit frame 23 (described later) of the drum unit 21K.

The developing unit 22K includes a developing roller 27K, a supply roller 28K, and a thickness-regulating blade 29K.

The developing roller 27K is rotatably provided in an upper end portion of the developing unit 22K. The developing roller 27K is generally cylindrical extending in the left-right direction. The developing roller 27K is rotatably supported to a developing-unit frame 26 (described later) of the developing unit 22K, and is in contact with a front end portion of the photosensitive drum 24K.

The supply roller 28K is positioned frontward and downward of the developing roller 27K. The supply roller 22 has a generally cylindrical shape extending in the left-right direction. The supply roller 28K is rotatably supported to the developing-unit frame 26 (described later) of the developing unit 22K. The supply roller 28K has an upper end portion in contact with a lower front end portion of the developing roller 21.

The thickness-regulating blade 29K is positioned rearward and downward of the developing roller 27K. The thickness-regulating blade 29K has a plate-like configuration extending in the left-right direction. The thickness-regulating blade 29K is in contact with a lower rear end portion of the developing roller 27K.

The scanner unit 15 is positioned downward of the respective process cartridges 17Y, 17M, 17C and 17K. More specifically, the scanner unit 15 is positioned between the process cartridges 17Y, 17M, 17C and 17K and the second pick-up roller 13 in a vertical direction. The scanner unit 15 is configured to irradiate laser beams to the respective photosensitive drums 24Y, 24M, 24C and 24K based on image data to expose the respective photosensitive drums 24Y, 24M, 24C and 24K to light.

The transfer unit 18 is positioned upward of the respective process cartridges 17Y, 17M, 17C and 17K. The transfer unit 18 includes a belt unit 31, a secondary transfer roller 32, and a belt cleaning unit 150.

The belt unit 31 generally extends in the front-rear direction. The belt unit 31 includes a first roller 33, a second roller 34, a third roller 35, an intermediate transfer belt 36, and primary transfer rollers 37Y, 37M, 37C and 37K.

The first roller 33 is positioned at a rear end portion of the belt unit 31, and is generally cylindrical shaped extending in the left-right direction.

The second roller 34 is positioned at a front end portion of the belt unit 31, and is generally cylindrical shaped extending in the left-right direction.

The third roller 35 is positioned at a lower rear portion of the belt unit 31, and is positioned frontward and downward of the first roller 33. The third roller 35 is generally cylindrical shaped extending in the left-right direction.

The intermediate transfer belt 36 is looped over the first roller 33, the second roller 34, and the third roller 35 under tension. The intermediate transfer belt 36 has a lower portion in contact with the photosensitive drums 24Y, 24M, 24C and 24K of the process cartridges 17Y, 17M, 17C and 17K attached to the main casing 2. The intermediate transfer belt 36 is circularly movable such that the lower portion thereof moves rearward.

The primary transfer rollers 37Y, 37M, 37C and 37K are arrayed between the second roller 34 and the third roller 35 in the front-rear direction with a space between neighboring rollers. Each of the primary transfer rollers 37Y, 37M, 37C and 37K is positioned upward of and in confrontation with corresponding one of the attached photosensitive drums 24Y, 24M, 24C and 24K via the intermediate transfer belt 36. The primary transfer rollers 37Y, 37M, 37C and 37K have a generally cylindrical shape extending in the left-right direction.

The secondary transfer roller 32 is positioned rearward of the first roller 33 such that the intermediate transfer belt 36 is nipped between the secondary transfer roller 32 and first roller 33. The secondary transfer roller 32 is generally cylindrical shaped extending in the left-right direction.

The belt cleaning unit 150 includes a belt-cleaning frame 151, a belt-cleaning blade 152, and a belt-cleaning screw 153.

The belt-cleaning frame 151 is generally box shaped extending in the left-right direction. The belt-cleaning frame 151 has an upper rear end portion in which an opening 106 is formed to penetrate the upper rear end portion of the belt-cleaning frame 151 in the front-rear direction.

The belt-cleaning blade 152 is positioned at a rear end portion of the belt-cleaning frame 151. The belt-cleaning blade 152 has a generally flat plate shape extending in the left-right direction. The belt-cleaning blade 152 has an upper end portion in contact with a front end portion of the intermediate transfer belt 36. The belt-cleaning blade 152 faces the opening 106.

The belt-cleaning screw 153 is provided in a lower end portion of the belt-cleaning frame 151 and extends in the left-right direction. The belt-cleaning screw 153 has a right end rotatably supported by a right wall constituting a first conveying tube 161 (FIG. 2) described later.

The fixing unit 19 is positioned upward of the secondary transfer roller 32. The fixing unit 19 includes a heat roller 41 and a pressure roller 42 in pressure contact with a rear end portion of the heat roller 41.

The sheet-discharging unit 4 includes a discharge tray 43, discharge rollers 48, reverse rollers 44, and a guide 45.

The discharge tray 43 is formed in the upper wall of the main casing 2 and is recessed downward.

The discharge rollers 48 are positioned rearward and upward of the discharge tray 43. The discharge rollers 48 are generally cylindrical shaped and extend in the left-right direction.

The reverse rollers 44 are positioned upward of the fixing unit 19. The reverse rollers 44 have a generally cylindrical shape and extend in the left-right direction.

The guide 45 is positioned above the fixing unit 19. The guide 45 is movable between a discharge position indicated by a solid line in FIG. 1 and a reverse position indicated by a phantom line in FIG. 1. As shown in FIG. 1, in the discharge position, the guide 45 extends generally in the vertical direction in a side view and has an upper end portion pivotally movably supported to the main casing 2. In the discharge position, a lower end portion of the guide 45 is rearward relative to the upper end portion thereof so that the sheet can be directed toward the discharge rollers 48. In the reverse position, the lower end portion of the guide 45 is positioned frontward than that at the discharge position, so that the sheet can be directed toward the reverse rollers 44.

The sheet-discharging unit 4 further includes a first conveying path 183 and a second conveying path 184. The sheet from the fixing unit 19 is conveyed toward the discharge rollers 48 along the first conveying path 183 when the guide 45 is at the discharge position. The sheet is conveyed from the fixing unit 19 to the reverse rollers 44 along the second conveying path 184 when the guide 45 is at the reverse position. The sheet nipped by the reverse rollers 44 is configured to be conveyed downward while passing rearward of the fixing unit 19 by reverse rotations of the reverse rollers 44, and is then turned upward in a U-shaped fashion toward a position between the intermediate transfer belt 36 and the secondary transfer roller 32.

The image-reading unit 5 is positioned upward of the main casing 2 so as to cover the discharge tray 43 from above. The image-reading unit 5 includes a platen 46 on which an original document is to be placed, and a pressure cover 47 pivotally movably supported to the platen 46.

2. Detailed Structure of the Main Casing

The main casing 2 includes the outer frame 50 and the inner frame 51, as described earlier.

Figure 7:
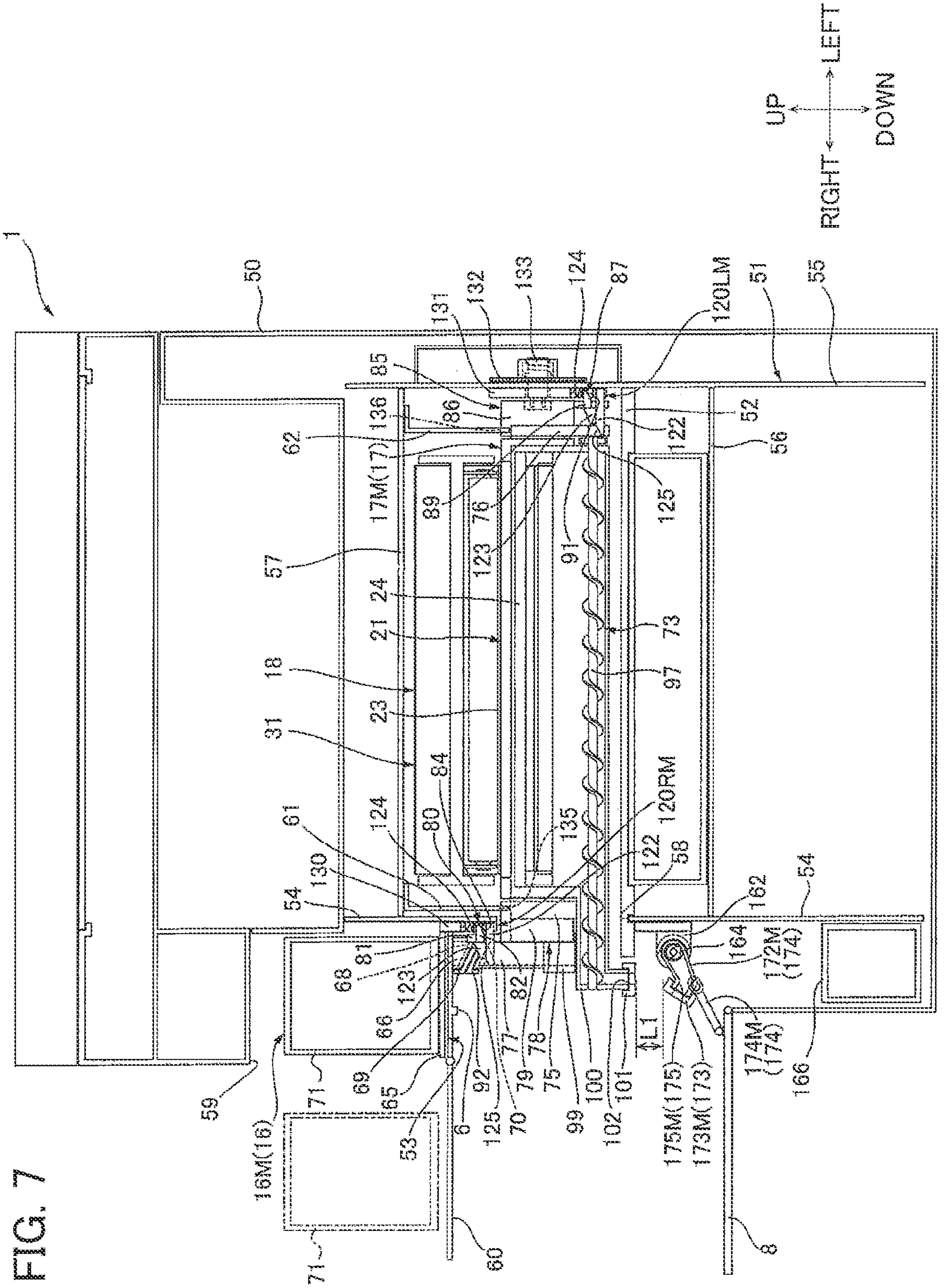
FIG. 7 is a cross-sectional view of the printer according to the first embodiment taken along the line B-B shown in FIG. 1, and showing a state where the process cartridge is at the first position and the connector tube is at a non-communication position.

As shown in FIG. 6, the outer frame 50 has a box-like shape and is formed of a resin material. The right wall of the outer frame 50 is formed with an opening 6 as an example of a sixth opening for allowing communication between an inside and an outside of the main casing 2 in the left-right direction. The outer frame 50 also includes a cover 8 pivotally movable between a closed position for closing the opening 6 (FIG. 6) and an open position for opening the opening 6 (FIG. 7).

The outer frame 50 further includes: mounting units 53Y, 53M, 53C, and 53K having respective openings 59Y, 59M, 59C, and 59K; covers 60Y, 60M, 60C, and 60K capable of opening and closing over the openings 59Y, 59M, 59C, and 59K; and a cover 64 (see FIG. 2) that opens and closes over the access opening 63 formed in the front wall.

The mounting units 53Y, 53M, 53C and 53K are respectively disposed on the upper-right sides of the corresponding process cartridges 17Y, 17M, 17C and 17K. The mounting units 53Y, 53M, 53C and 53K are arranged at intervals in the front-rear direction. The openings 59Y, 59M, 59C and 59K provide communication between the interior of the corresponding mounting units 53Y, 53M, 53C and 53K and the exterior of the outer frame 50 in the left-right direction.

In the first embodiment, the mounting units 53Y, 53M, 53C and 53K all have the same construction. Therefore, only the mounting unit 53M will be described below as a representative example. Similarly, the covers 60Y, 60M, 60C and 60K all have the same construction and, therefore, only the cover 60M will be described below.

The mounting unit 53M includes a receiving part 65M, and an input tube 66M.

The receiving part 65M has a box-like shape with an open top. As shown in FIG. 2, the receiving part 65M has a bottom portion having a rounded W-shape in a side view. An opening 67M (see FIG. 2) is formed in a front end portion of the bottom portion of the receiving part 65M to penetrate the same vertically.

The input tube 66M extends downward from the front end portion of the receiving part 65M. The input tube 66M has a general cylindrical shape that is elongated vertically. The input tube 66M has a top end that is in vertical communication with the opening 67M of the receiving part 65M. The input tube 66M has a bottom end portion that slopes downward toward the left. The bottom end portion is formed with an opening 68M, as an example of a third opening. That is, the opening 68 occupies a plane that slopes downward toward the left. The input tube 66M is provided with a seal 69M on its bottom end.

The seal 69M is formed of an elastic material and has a frame-like structure that is generally rectangular in a plan view. The seal 69M is arranged around the opening 68M.

The cover 60M is pivotably movably supported to a bottom edge on the right wall of the mounting unit 53M. The cover 60 can pivot pivot between a closed position for covering the opening 59M and an open position (see FIG. 7) for exposing the opening 59M.

The cover 64 has a plate-like shape that is generally rectangular in a front view. The cover 64 is pivotably movably supported to a bottom edge on the front wall of the main casing 2 (outer frame 50). The cover 64 can pivot between a closed position for covering the access opening 63 and an open position for exposing the access opening 63.

The cover 8 is provided with detectors 110Y, 110M, 110C, and 110K. Since the detectors 110Y, 110M, 110C and 110K all have the same construction, only the detector 110K will be described below as a representative example.

Figure 4A:
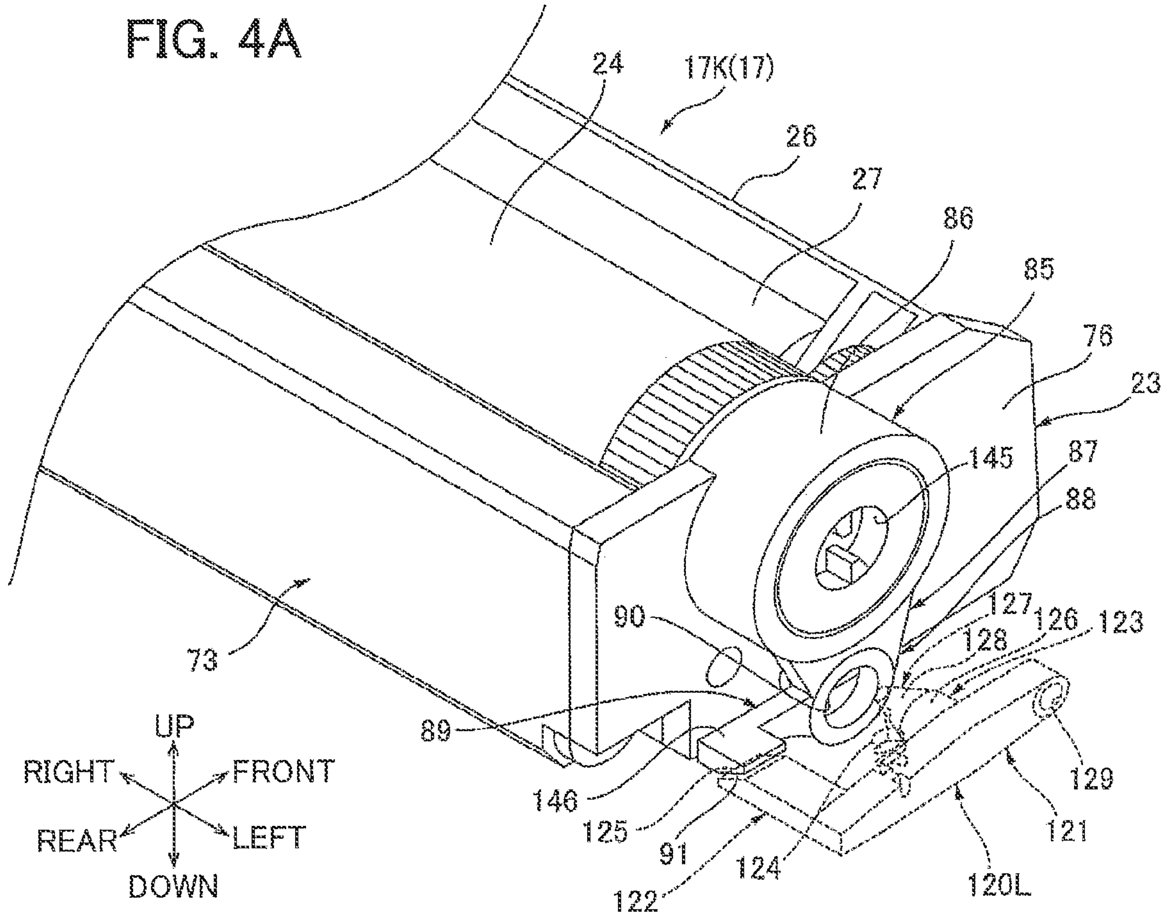
FIG. 4A is a perspective view of a left end portion of the process cartridge shown in FIG. 3.
Figure 4B:
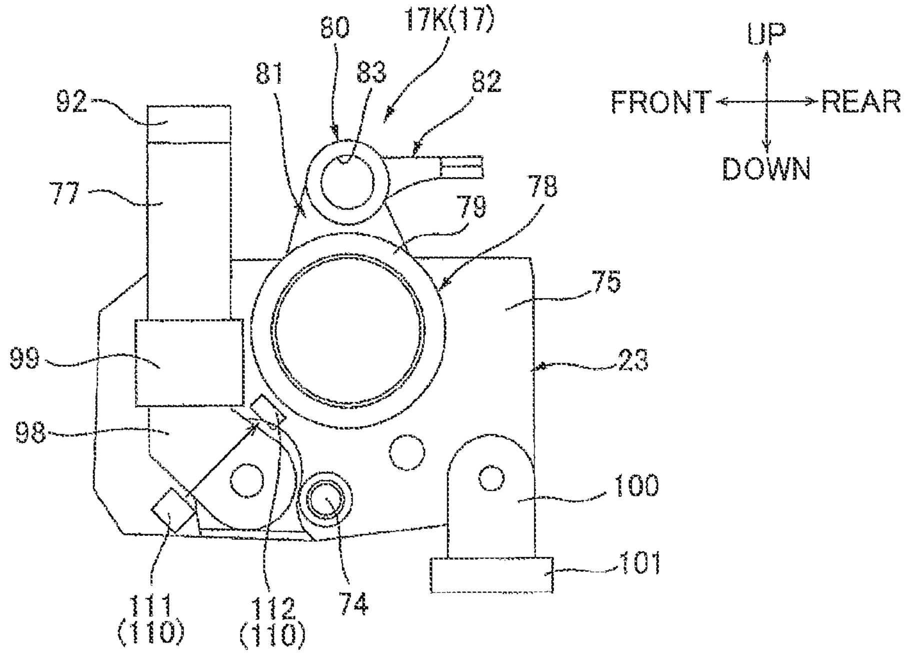
FIG. 4B is a right side view of the process cartridge shown in FIG. 3.

As shown in FIG. 4B, the detector 110K includes a light-emitting element 111K, and a light-receiving element 112K.

The light-emitting element 111K is disposed on the cover 8 at a position to the lower-front side of a second conveying tube 98K described later.

The light-receiving element 112K is disposed on the cover 8 at a position on the upper-rear side of the second conveying tube 98K described later. The light-receiving element 112K is configured to receive light emitted from the light-emitting element 111K.

The inner frame 51 is formed of a metallic material. As shown in FIGS. 2 and 6, the inner frame 51 includes a first side plate 54 having openings 58 and 107 formed therein, a second side plate 55, a bottom plate 56 supporting the scanning unit 15, a top plate 57 connected to the first side plate 54 and second side plate 55, a center plate 52, a first positioning part 61, and a second positioning part 62.

The first side plate 54 constitutes a right end of the inner frame 51. The first side plate 54 has a flat plate shape that is generally rectangular in a side view and elongated vertically.

The opening 58 is formed in a vertical center region of the first side plate 54. The opening 58 has a general rectangular shape in a side view. As shown in FIG. 2, the opening 58 has a front-rear dimension that is larger than a size of the process cartridges 17Y, 17M, 17C, and 17K juxtaposed in the front-rear direction. The opening 58 penetrates the first side plate 54 in the left-right direction.

As shown in FIG. 2, the opening 107 is formed in a front end region of the first side plate 54. The opening 107 is positioned frontward of the opening 58 and has a circular shape in a side view. The opening 107 penetrates the first side plate 54 in the left-right direction.

The second side plate 55 constitutes a left end of the inner frame 51. The second side plate 55 is disposed leftward of and apart from the first side plate 54. The second side plate 55 has a flat plate shape that is generally rectangular in a side view and elongated vertically. Coupling gears 132 and couplings 133 are disposed on a left surface of the second side plate 55.

The coupling gears 132 are rotatably supported on the second side plate 55.

The couplings 133 are supported on the corresponding coupling gears 132 so as to be capable of moving relative to the same. Each of the couplings 133 has a right end that protrudes rightward from the second side plate 55. The couplings 133 can move in the left-right direction. Springs (not shown) constantly urge the couplings 133 rightward.

The bottom plate 56 is disposed beneath the scanning unit 15 to support the same. The bottom plate 56 has a flat plate shape that is generally rectangular in a plan view and elongated in the left-right direction. The bottom plate 56 is connected to the first side plate 54 and second side plate 55.

The top plate 57 is disposed above the belt unit 31. The top plate 57 has a flat plate shape that is generally rectangular in a plan view and elongated in the left-right direction.

The center plate 52 is disposed beneath the process cartridges 17Y, 17M, 17C, and 17K and above the scanning unit 15. The center plate 52 has a flat plate shape that is generally rectangular in a plan view and elongated in the left-right direction. The center plate 52 is formed of a resin material. The center plate 52 has a right end that extends rightward beyond a bottom edge defining the opening 58.

The first positioning part 61 is disposed beneath a right end portion of the top plate 57 and between the first side plate 54 and belt unit 31 in the left-right direction. The first positioning part 61 is positioned above the process cartridges 17Y, 17M, 17C, and 17K. The first positioning part 61 is a plate-shaped member that is generally rectangular in a side view and L-shaped in a front view. The first positioning part 61 has a top end portion connected to the right end portion of the top plate 57. The first positioning part 61 has a bottom end portion that extends downward to approximately the same position as the bottom end of the belt unit 31 in the vertical direction. The first positioning part 61 includes first positioning grooves 135Y, 135M, 135C, and 135K.

The first positioning grooves 135Y, 135M, 135C, and 135K are formed in a bottom edge of the first positioning part 61. The first positioning grooves 135Y, 135M, 135C, and 135K are spaced at intervals from each other in the diagonal direction from the upper front to the lower rear. The first positioning grooves 135Y, 135M, 135C, and 135K are recessed upward from the bottom edge of the first positioning part 61.

The second positioning part 62 is disposed below a left end portion of the top plate 57 and between the second side plate 55 and the belt unit 31 in the left-right direction. The second positioning part 62 is a plate-shaped member that is generally rectangular in a side view and L-shaped in a front view. The second positioning part 62 has a top end portion connected to the left end portion of the top plate 57; and a bottom end portion that extends to approximately the same vertical position as the bottom end of the belt unit 31. The second positioning part 62 includes second positioning grooves 136Y, 136M, 136C, and 136K.

The second positioning grooves 136Y, 136M, 136C, and 136K are formed in a bottom edge of the second positioning part 62 and are spaced at intervals from each other in the diagonal direction from the upper front to the lower rear. The second positioning grooves 136Y, 136M, 136C, and 136K are recessed upward from the bottom edge of the second positioning part 62. In a left-right projection, the second positioning grooves 136Y, 136M, 136C, and 136K are respectively aligned with the first positioning grooves 135Y, 135M, 135C, and 135K.

3. Detailed Description of the Toner Cartridges

Referring to FIG. 2, the toner cartridge 16K includes a cartridge frame 71K having an opening 72K formed therein, a first agitator 141K, and a second agitator 142K. The cartridge frame 71K has a box-like shape and is elongated in the left-right direction. The cartridge frame 71K has a bottom wall that has a general rounded W-shape in a side view. The cartridge frame 71K includes a partitioning plate 137K.

The partitioning plate 137K extends diagonally downward and rearward from an inner peripheral surface of a front wall constituting the cartridge frame 71K. The partitioning plate 137K partitions the cartridge frame 71K into a large accommodating chamber 138K disposed constituting a rear portion of the cartridge frame 71K, and a small accommodating chamber 139K constituting a front portion of the cartridge frame 71K. The large accommodating chamber 138K is larger than the small accommodating chamber 139K.

The first agitator 141K is accommodated in the large accommodating chamber 138K. The first agitator 141 is rotatably supported by the cartridge frame 71K.

The second agitator 142K is accommodated in the small accommodating chamber 139K and is rotatably supported by the cartridge frame 71K.

The opening 72K is formed in a lower-front end portion of the cartridge frame 71K. The opening 72K vertically penetrates a bottom wall constituting the small accommodating chamber 139K. The opening 72K is an example of a first opening.

4. Detailed Description of the Process Cartridges (1) Drum Unit

Figure 3:
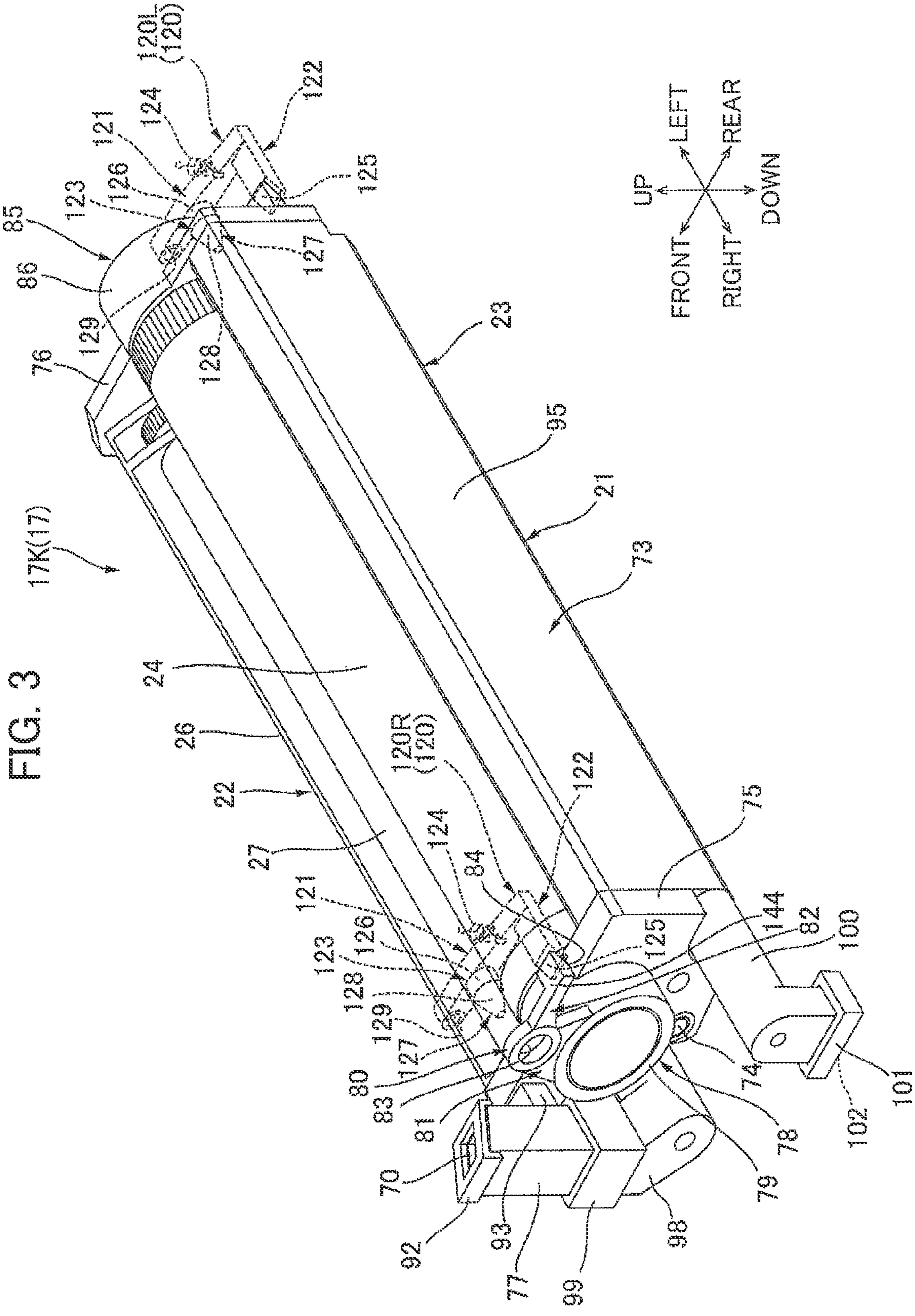
FIG. 3 is a perspective view of a process cartridge shown in FIG. 2 in the printer according to the first embodiment.

As shown in FIG. 3, the drum unit 21K includes the drum-unit frame 23K.

The drum-unit frame 23K has a box-like shape that is elongated in the left-right direction and open on the top side. The drum-unit frame 23K includes a first side plate 75K, a second side plate 76K, a first conveying tube 77K having an opening 70K as an example of a second opening, and a drum cleaning unit 73K.

As shown in FIGS. 3 and 4B, the first side plate 75K constitutes a right end portion of the drum-unit frame 23K. The first side plate 75K has a flat plate shape that is generally rectangular in a side view. The first side plate 75K includes a first support part 78K.

The first support part 78K is disposed in a front-rear center region of the first side plate 75K to protrude rightward therefrom. The first support part 78K includes a first cylindrical part 79K, and a first engagement part 80K.

The first cylindrical part 79K has a general cylindrical shape that is elongated in the left-right direction. The first cylindrical part 79K protrudes rightward from a right surface of the first side plate 75K. Also, as shown in FIGS. 2 and 4B, the first cylindrical part 79K has an upper end portion that protrudes upward from an upper edge of the first side plate 75K. The first cylindrical part 79K thus has a top surface positioned higher than a top surface of the first side plate 75K. The first cylindrical part 79K rotatably supports a right end of the photosensitive drum 24K.

The first engagement part 80K protrudes upward from a top edge of the first cylindrical part 79K. The first engagement part 80K is positioned between the opening 70K formed in the first conveying tube 77K and an opening 102K formed in a discharge tube 100K described later in the front-rear direction. The first engagement part 80K includes a first plate part 81K having an opening 83K formed therein, a first bar part 82K, and a first protruding part 144K.

The first plate part 81K has a flat plate shape that extends upward from the first cylindrical part 79K.

The opening 83K is formed in an upper end portion of the first plate part 81K. The opening 83K has a general circular shape in a side view and penetrates the upper end portion of the first plate part 81K in the left-right direction.

The first bar part 82K protrudes rearward from the upper end portion of the first plate part 81K.

The first protruding part 144K protrudes leftward from a rear end of the first bar part 82K. The first protruding part 144K includes a first sloped surface 84K.

The first sloped surface 84K constitutes a bottom surface of the first protruding part 144K. The first sloped surface 84K slopes upward toward the left side.

As shown in FIG. 4A, the second side plate 76K constitutes a left end portion of the drum-unit frame 23K and is positioned leftward and apart from the first side plate 75K. The second side plate 76K has a flat plate shape that is generally rectangular in a side view. The second side plate 76K is separated leftward from the opening 70K by a greater distance than the first side plate 75K is. The second side plate 76K includes a second support part 85K.

The second support part 85K is provided in a front-rear center region of the second side plate 76K and protrudes leftward from the same. The second support part 85K includes a second cylindrical part 86K, and a second engagement part 87K.

The second cylindrical part 86K has a general cylindrical shape that is elongated in the left-right direction. The second cylindrical part 86K protrudes leftward from the left surface of the second side plate 76K. Also, the second cylindrical part 86K has an upper end portion that protrudes upward from an upper edge of the second side plate 76K. The second cylindrical part 86K thus has a top surface positioned higher than a top surface of the second side plate 76K. The second cylindrical part 86K rotatably supports a left end of the photosensitive drum 24K. Here, the left end of the photosensitive drum 24K has a coupling recess 145K for engaging with the coupling 133K.

The second engagement part 87K protrudes downward from a bottom edge of the second cylindrical part 86K. The second engagement part 87K includes a second plate part 88K having an opening 90K formed therein, a second bar part 89K, and a second protruding part 146K.

The second plate part 88K has a flat plate shape that extends downward from the second cylindrical part 86K.

The opening 90K is formed in a bottom end portion of the second plate part 88K. The opening 90K has a general circular shape in a side view and penetrates the bottom end portion of the second plate part 88K in the left-right direction.

The second bar part 89K protrudes rearward from the bottom end portion of the second plate part 88K.

The second protruding part 146K protrudes leftward from a rear end of the second bar part 89K. The second protruding part 146K includes a second sloped surface 91K.

The second sloped surface 91K constitutes a bottom surface of the second protruding part 146K. The second sloped surface 91K slopes upward toward the left side.

As shown in FIG. 3, the first conveying tube 77K is assembled to the first side plate 75K through a fixing part 93K that protrudes rightward from the right surface of the first side plate 75K. The first conveying tube 77K has a general square cylindrical shape that is elongated vertically. The first conveying tube 77 has a top wall that slopes downward toward the left. The opening 70 is formed in the top wall of the first conveying tube 77. Accordingly, the opening 70K also occupies a plane that slopes downward toward the left. The opening 70K can be in vertical communication with the opening 68K formed in the input tube 66K. As shown in FIG. 6, the opening 70K in the first conveying tube 77K is arranged to the right of the first positioning part 61. The first conveying tube 77K is provided with a seal 92K on its upper end.

The seal 92K is formed of an elastic material in a frame-like shape that is rectangular in a plan view. The seal 92K is arranged around the opening 70K. When the process cartridge 17K is mounted in the main casing 2, the seal 92K contacts the seal 69K of the input tube 66K.

As shown in FIGS. 1 and 3, the drum cleaning unit 73K is provided on rearward of the photosensitive drum 24K. The drum cleaning unit 73K includes a drum cleaning frame 95K having an opening 105K formed therein, a drum cleaning blade 96K as an example of a cleaning member, a drum cleaning screw 97K, and the discharge tube 100K having the opening 102K as an example of a fourth opening.

The drum cleaning frame 95K has a box-like shape and is elongated in the left-right direction. The drum cleaning frame 95K has a right end supported on the first side plate 75K, and a left end supported on the second side plate 76K.

As shown in FIG. 1, the opening 105K is formed in an upper-front portion of the drum cleaning frame 95K and penetrates the same in the front-rear direction.

The drum cleaning blade 96K is arranged on a front portion of the drum cleaning frame 95K. The drum cleaning blade 96K has a flat plate shape and is elongated in the left-right direction. The drum cleaning blade 96K has a top end portion positioned in confrontation with the opening 105K in the front-rear direction and in contact with a rear end portion on a circumferential surface of the photosensitive drum 24K.

The drum cleaning screw 97K is disposed in a bottom portion of the drum cleaning frame 95K and is oriented in the left-right direction. The drum cleaning screw 97K has a left end that is rotatably supported by the second side plate 76K. The drum cleaning screw 97K has a right end that is positioned inside the discharge tube 100K.

As shown in FIG. 3, the discharge tube 100K has a general cylindrical shape and extends rightward from a right end portion of the drum cleaning frame 95K, and then bends and extends downward. The opening 102K is formed in a bottom end of the discharge tube 100K. The discharge tube 100 has a right wall that rotatably supports the right end of the drum cleaning screw 97K. The discharge tube 100K is provided with a seal 101K on its bottom end.

As shown in FIG. 6, the opening 102K formed in the discharge tube 100K is positioned farther rightward than the opening 70K formed in the first conveying tube 77K. Further, the opening 102K in the discharge tube 100K is disposed rightward of the first positioning part 61K.

The seal 101K is formed of an elastic material in a frame-like shape that is rectangular in a plan view. The seal 101K is arranged around the opening 102K on the bottom end of the discharge tube 100K.

(2) Developing Unit

As shown in FIG. 3, the developing unit 22K is positioned between the front end portions of the first side plate 75K and second side plate 76K constituting the drum-unit frame 23K. The developing unit 22K further includes the developing-unit frame 26K, and a unit screw 30K (see FIG. 1).

The developing-unit frame 26K has a box-like shape that is elongated in the left-right direction and open on the top side. The developing-unit frame 26K includes a rotational shaft 74K, and the second conveying tube 98K.

The rotational shaft 74K protrudes rightward from a right wall constituting the developing-unit frame 26K. The rotational shaft 74K has a general columnar shape and is elongated in the left-right direction. The rotational shaft 74K is rotatably supported in a bottom end portion of the first side plate 75K. The rotational shaft 74K also protrudes leftward from a left wall of the developing-unit frame 26K. The protruding portion (left end portion) of the rotational shaft 74K is rotatably supported in a bottom end portion of the second side plate 76K. In this way, the developing-unit frame 26K can pivotally movable about the rotational shaft 74K relative to the drum-unit frame 23K. More specifically, the developing-unit frame 26K can pivotally move between a contact position in which the developing roller 27K contacts the photosensitive drum 24K, and a separated position in which the developing roller 27K is separated from the photosensitive drum 24K.

The second conveying tube 98K is positioned rightward of the first side plate 75K constituting the drum-unit frame 23K. The second conveying tube 98K has a general cylindrical shape that first extends rightward from the right end of the developing-unit frame 26K, and then bends and extends upward. The second conveying tube 98K is configured of a light-permeable member, at least in a region in which the light-emitting element 111K and light-receiving element 112K confront each other. Hence, if a sufficient amount of toner is present in the second conveying tube 98K, the light from the light-emitting element 111K is blocked by the toner and thus cannot be received by the light-receiving element 112K. The second conveying tube 98K has a top end in communication with a bottom end of the first conveying tube 77K. A connector 99K is provided to surround the junction of the second conveying tube 98K and first conveying tube 77K.

The connector 99K is formed of an elastic material, and specifically a sponge material in the present embodiment. The connector 99 has a general cylindrical shape that is elongated vertically. The connector 99K has a top end portion connected to the bottom end of the first conveying tube 77K, while a bottom end of the connector 99K is connected to the top end of the second conveying tube 98K. In this way, the internal space of the first conveying tube 77K is in communication with the internal space in the second conveying tube 98K through the connector 99K. Further, the first conveying tube 77K and second conveying tube 98K are joined on the right side of the first side plate 75K.

As shown in FIG. 1, the unit screw 30K is arranged in a bottom portion of the developing-unit frame 26K. The unit screw 30K is positioned rearward of the supply roller 28K. The right end of the unit screw 30K is rotatably supported in the right wall of the second conveying tube 98K (see FIG. 3), while the left end of the unit screw 30K is rotatably supported in the left wall of the developing-unit frame 26K.

5. Structure of the Urging Members

As shown in FIGS. 2 and 6, urging members 120RY, 120RM, 120RC and 120RK and urging members 120LY, 120LM, 120LC, and 120LK are disposed in the main casing 2 on respective ends of the corresponding process cartridges 17Y, 17M, 17C, and 17K. Other than being disposed beneath the left ends of the process cartridges 17 and to the left of the second positioning part 62, the urging members 120LY, 120LM, 120LC, and 120LK have the same structure and configuration as the urging members 120RY, 120RM, 120RC and 120RK. Therefore, the urging members 120RY, 120RM, 120RC and 120RK will serve as a representative example in the following description. Further, since the urging members 120RY, 120RM, 120RC and 120RK have the structure, the urging member 120RM will be used as a representative example in the following description.

Figure 5:
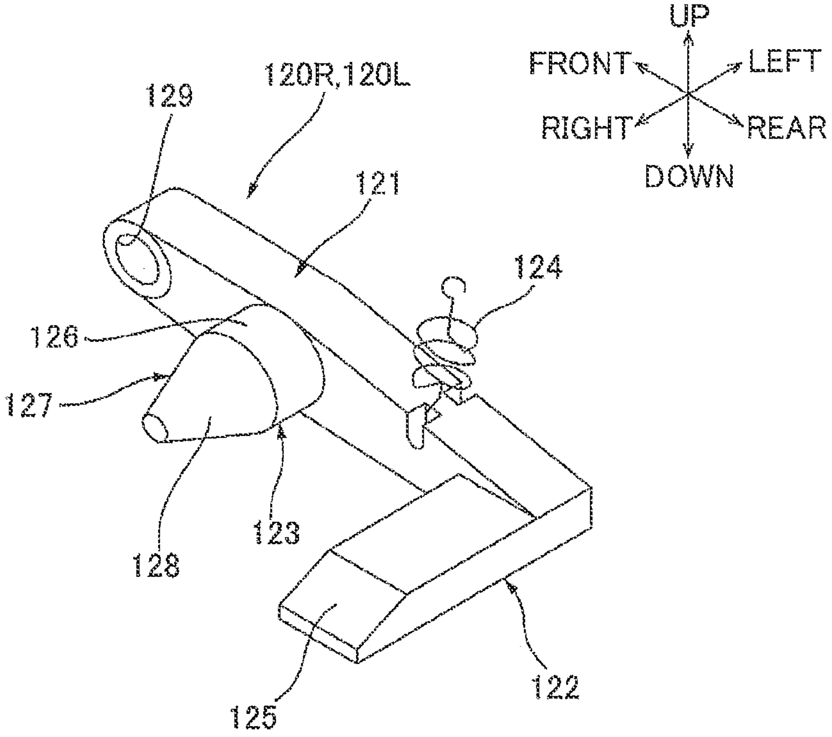
FIG. 5 is a perspective view of an urging member shown in FIG. 3.

As shown in FIG. 6, the urging member 120RM is disposed above the right end of the process cartridge 17M and overlaps the first conveying tube 77M in a front-rear projection. The urging member 120RM is positioned to the right of the first positioning part 61 and to the left of the opening 70M. As shown in FIG. 5, the urging member 120RM includes a pivoting part 121M having a center hole 129M formed therein, a contact part 122M, an engaging part 123M, and a tension spring 124M.

The pivoting part 121M has a general bar shape that is elongated in the front-rear direction. The pivoting part 121M has a front end serving as an example of a first end, while a rear end thereof serves as an example of a second end. The front-rear direction is an example of an orthogonal direction.

The center hole 129M is formed in the front end of the pivoting part 121M. The center hole 129M has a general circular shape in a side view and penetrates the front end of the pivoting part 121M in the left-right direction. The center hole 129M is engaged with a boss (not shown) provided on either the first side plate 54 or the second side plate 55. Through this engagement, the pivoting part 121M can pivot about a central axis of the center hole 129M.

The contact part 122M protrudes rightward from the rear end of the pivoting part 121M. The contact part 122M has a general plate shape that is elongated in the left-right direction. The contact part 122M includes an engaging surface 125M.

The engaging surface 125M constitutes a top surface on a right end portion of the contact part 122M. The engaging surface 125M slopes upward toward the left.

The engaging part 123M protrudes rightward from a front-rear center portion of the pivoting part 121M. The engaging part 123M includes a base part 126M, and a tip-end part 127M.

The base part 126M has a general columnar shape and is elongated in the left-right direction. The base part 126M protrudes rightward from the front-rear center portion of the pivoting part 121M.

The tip-end part 127M protrudes rightward from a right end of the base part 126M. The tip-end part 127M has a conical shape that tapers toward the right. The tip-end part 127M has a peripheral surface that constitutes a sloped surface 128M.

That is, the sloped surface 128M has a top edge that slopes upward toward the left.

The tension spring 124M is a helical spring whose bottom end is engaged with the rear end of the pivoting part 121M. More specifically, when viewed in the left-right direction, the bottom end of the tension spring 124M is disposed between the contact part 122M and the engaging part 123M. In other words, the tension spring 124M is disposed closer to the rear end of the pivoting part 121M than the engaging part 123M is to the rear end of the pivoting part 121M.

As shown in FIG. 6, the urging member 120RM is pivotably movably supported on the first side plate 54 through the boss (not shown) thereof inserted through the center hole 129M. Accordingly, the urging member 120RM can pivot about the central axis of the center hole 129M aligned in the left-right direction. Further, the top end of the tension spring 124M is engaged with a first mounting part 130 provided on a right surface of the first side plate 54. With this arrangement, the rear end of the pivoting part 121M is constantly urged upward. Note that the tension spring 124 in each of the urging members 120L is engaged with a second mounting part 131 provided on a right surface of the second side plate 55.

6. Structures Related to Waste Toner Conveyance

As shown in FIG. 2, the main casing 2 includes a first conveying tube 161, a second conveying tube 162, a conveying screw 164, a third conveying tube 165, and a waste toner container 166 having an opening 177.

The first conveying tube 161 is disposed rightward of the front end portion of the first side plate 54. The first conveying tube 161 has a general cylindrical shape and is elongated vertically. The first conveying tube 161 has a top end that is connected to the lower end portion of the belt-cleaning frame 151 of the belt cleaning unit 150 shown in FIG. 1 via the opening 107 formed in the first side plate 54. The right wall constituting the first conveying tube 161 rotatably supports the right end of the belt cleaning screw 153.

The second conveying tube 162 is disposed below the first conveying tube 161 and extends in the diagonal direction from the upper front to the lower rear. The second conveying tube 162 has a general cylindrical shape. The second conveying tube 162 is fixed to the first side plate 54. The second conveying tube 162 has a front end connected to a bottom end of the first conveying tube 161. The second conveying tube 162 includes a waste toner conveying tube 163 therein.

The waste toner conveying tube 163 is disposed within the second conveying tube 162. The waste toner conveying tube 163 can rotate relative to the second conveying tube 162. The waste toner conveying tube 163 is connected to connector tubes 172 described later, and movement of the connector tubes 172 causes the waste toner conveying tube 163 to rotate relative to the second conveying tube 162, as will be described later. The waste toner conveying tube 163 includes a conveying cylindrical part 171, and the connector tubes 172Y, 172M, 172C, and 172K having respective openings 175Y, 175M, 175C, and 175K.

The conveying cylindrical part 171 is disposed in the second conveying tube 162 and extends along the same direction of the second conveying tube 162 (i.e., in the diagonal direction). The conveying cylindrical part 171 has a general cylindrical shape.

As shown in FIG. 2, the connector tubes 172Y, 172M, 172C, and 172K are arranged at intervals from each other in the diagonal direction in which the conveying cylindrical part 171 extends. Since the connector tubes 172Y, 172M, 172C, and 172K all have the same construction, only the connector tube 172M will be described below as a representative example.

As shown in FIG. 6, the connector tube 172M has a general cylindrical shape that extends diagonally upward and rightward from the conveying cylindrical part 171, and then bends and extends upward. The opening 175M is formed in a top end of the connector tube 172M. The opening 175M is as an example of a fifth opening. As shown in FIG. 6, the connector tube 172M includes a seal 173M, and an interlocking member 174M.

The opening 175M formed in the connector tube 172M is capable of communicating with the opening 102M of the discharge tube 100M, as will be described later.

The seal 173M is formed of an elastic material having a frame-like shape that is rectangular in a plan view. The seal 173M is arranged around the opening 175M. The seal 173M is in contact with the seal 101M of the discharge tube 100M.

The interlocking member 174M has a general bar shape. One end of the interlocking member 174M is attached to the top end of the connector tube 172M so as to be capable of rotating relative thereto, while the other end is attached to the cover 8 and is capable of rotating relative thereto. With this structure, the interlocking member 174M can move in conjunction with movement of the cover 8. Movement of the interlocking member 174M can in turn move the connector tube 172M between a communication position in which the connector tube 172M is communicated with the discharge tube 100, and a non-communication position in which such communication of the connector tube 172M to the discharge tube 100 is interrupted.

As shown in FIG. 2, the conveying screw 164 is disposed inside the conveying cylindrical part 171. The conveying screw 164 extends in the diagonal direction from the upper front to the lower rear. The conveying screw 164 is rotatably supported in the conveying cylindrical part 171.

The third conveying tube 165 extends downward from a rear end of the second conveying tube 162. The third conveying tube 165 has a general cylindrical shape that is elongated vertically. The third conveying tube 165 has an opening 200 formed in a bottom end portion of the third conveying tube 165. A shutter 176 is movably disposed in the bottom end portion of the third conveying tube 165. The opening 200 is configured to be opened and closed through the movement of the shutter 176.

The waste toner container 166 is disposed in a lower-right section of the main casing 2 to the rear of the access opening 63. The waste toner container 166 has a box-like shape that is elongated in the front-rear direction and can be mounted in and removed from the main casing 2 through the access opening 63.

The waste toner container 166 has an opening 177 formed in an upper-rear corner portion of the waste toner container 166. The opening 177 penetrates a top wall constituting the waste toner container 166 vertically. A shutter 178 is movably disposed on the top wall of the waste toner container 166 such that the opening 177 can be opened and closed through the movement of the shutter 178. When the waste toner container 166 is mounted in the main casing 2, the opening 177 is in communication with the opening 200 formed in the third conveying tube 165. Hence, the waste toner conveying tube 163 is connected to the waste toner container 166 through the third conveying tube 165.

7. Operations for Mounting and Removing the Toner Cartridges

In the following description for the mounting and removal of the toner cartridges 16 and process cartridges 17, operations for mounting and removing the toner cartridge 16M and process cartridge 17M will be described as representative examples.

For mounting the toner cartridge 16M in the main casing 2, the cover 60M is placed in its open position shown in FIG. 7. The toner cartridge 16M is then inserted into the receiving part 65M of the mounting unit 53M via the opening 59M. When the toner cartridge 16M has been mounted on the receiving part 65M, the opening 72M of the toner cartridge 16M is in vertical communication with the opening 67M formed in the receiving part 65M of the mounting unit 53M.

To remove the toner cartridge 16M from the main casing 2, the cover 60M is again placed in its open position, and the toner cartridge 16M is extracted from the main casing 2 through the opening 59M.

8. Operations for Mounting and Removing the Process Cartridges

Figure 8:
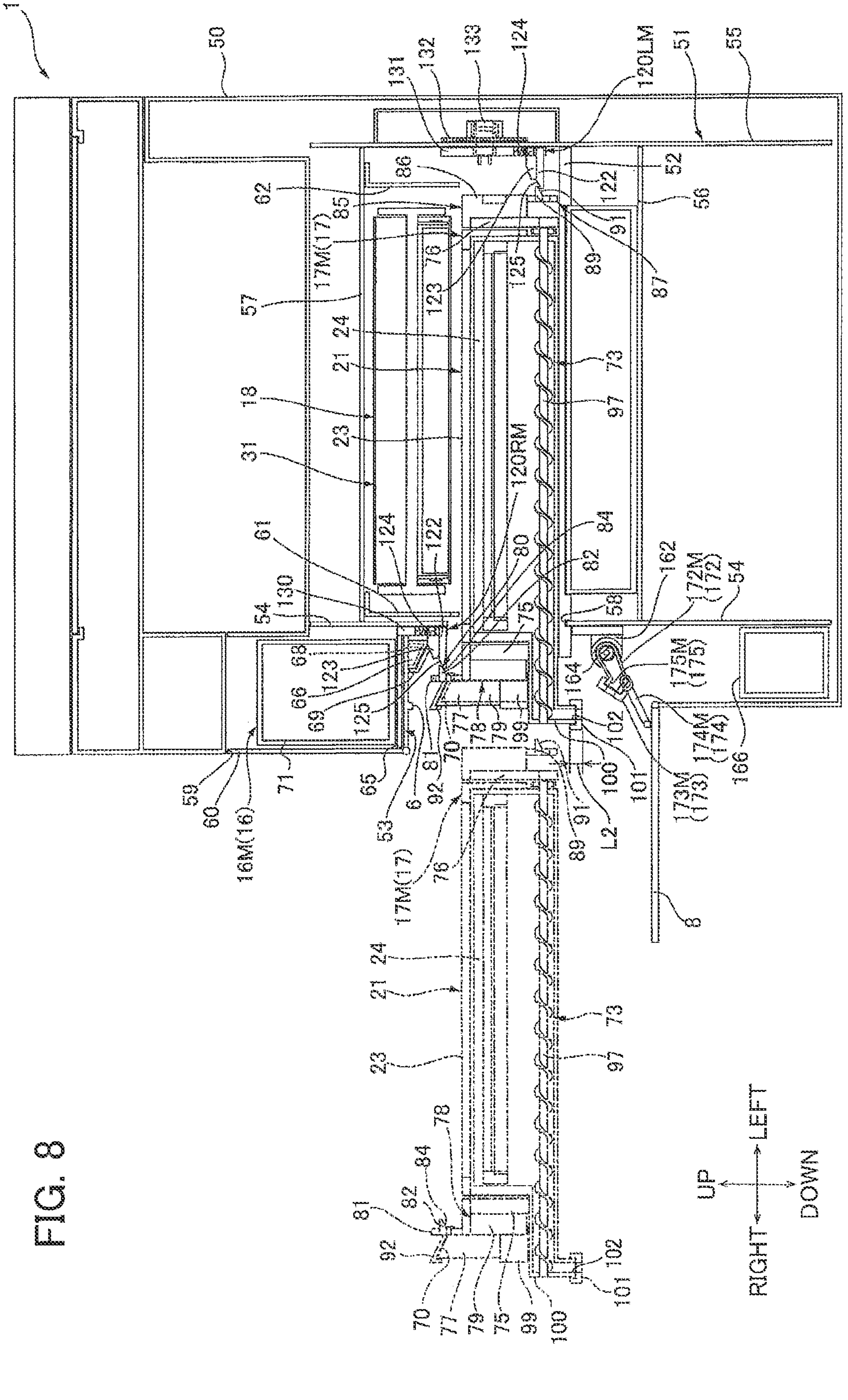
FIG. 8 is a cross-sectional view of the printer according to the first embodiment taken along the line B-B shown in FIG. 1, and showing a state where the process cartridge is at its second position and the connector tube is at the non-communication position.

To mount the process cartridge 17M in the main casing 2, the cover 8 is placed in its open position shown in FIG. 8. The process cartridge 17M is then inserted into the main casing 2 through the opening 6 and the opening 58, while slidingly moving along the center plate 52. At this time, the first sloped surface 84M of the first support part 78M in the process cartridge 17M contacts the engaging surface 125M of the urging member 120RM, as shown in solid lines in FIG. 8. Further, the second sloped surface 91M of the second support part 85M in the process cartridge 17M contacts the engaging surface 125M of the urging member 120LM.

As the process cartridge 17M is further moved leftward, the first sloped surface 84M slides diagonally upward and leftward along the engaging surface 125M of the urging member 120RM, and the second sloped surface 91M slides diagonally upward and leftward along the engaging surface 125M of the urging member 120LM. Consequently, the process cartridge 17M moves diagonally upward and leftward.

As a result, the opening 83M in the first support part 78M of the process cartridge 17M becomes fitted around the right end of the engaging part 123M constituting the urging member 120RM, and the opening 90M formed in the second support part 85M of the process cartridge 17M becomes fitted around the right end of the engaging part 123M constituting the urging member 120LM.

As the process cartridge 17M moves farther leftward, the inner edge of the opening 83M defined in the first support part 78M contacts the sloped surface 128M of the urging member 120RM, while the inner edge of the opening 90M defined in the second support part 85M contacts the sloped surface 128M of the urging member 120LM.

As the process cartridge 17M continues to move leftward, the inner edge of the opening 83M defined in the first support part 78M slides diagonally upward and leftward along the sloped surface 128M of the urging member 120RM, while the inner edge of the opening 90M defined in the second support part 85M slides diagonally upward and leftward along the sloped surface 128M of the urging member 120LM. Consequently, the process cartridge 17M moves diagonally upward and leftward.

At this time, the first sloped surface 84M separates from the engaging surface 125M formed on the urging member 120RM, and the second sloped surface 91M separates from the engaging surface 125M formed on the urging member 120LM.

As the process cartridge 17M continues to move leftward, the base part 126M of the urging member 120RM is inserted into the opening 83M formed in the first support part 78M. Similarly, the base part 126M on the urging member 120LM is inserted into the opening 90M formed in the second support part 85M.

Next, the top surface of the first cylindrical part 79M in the process cartridge 17M becomes engaged in the first positioning groove 135M formed in the first positioning part 61. Similarly, the top surface of the second cylindrical part 86M becomes engaged in the second positioning groove 136M formed in the second positioning part 62. At this time, the process cartridge 17M is fixed in position in the main casing 2, as shown in FIG. 2.

In addition, the coupling 133M is inserted into the coupling recess 145M formed in the left end of the photosensitive drum 24 supported by the drum-unit frame 23M. At this time, the tension spring 124M of the urging member 120RM urges the first support part 78M upward through the base part 126M of the urging member 120RM. Similarly, the tension spring 124M of the urging member 120LM urges the second support part 85M upward through the base part 126M of the urging member 120LM.

Due to the upward urging of the process cartridge 17M by the urging members 120RM and 120LM, the seal 92M of the first conveying tube 77M and the seal 69M on the input tube 66M of the mounting unit 53M contact each other with pressure. At this time, the opening 70M formed in the first conveying tube 77M is in vertical communication with the opening 68M formed in the mounting unit 53M.

In this state, the process cartridge 17M is in the first position, as shown in FIG. 6.

To remove the process cartridge 17M from the main casing 2, the cover 8 is first moved from its closed position to its open position shown in FIG. 7. At this time, the cover 8 pulls the interlocking member 174M downward and the interlocking member 174M in turn pulls the connector tube 172M downward, causing the waste toner conveying tube 163 to rotate counterclockwise in a rear view and the connector tube 172M to move into its non-communication position. The connector tube 172M is configured to move from its communication position to its non-communication position by a distance L1 in the vertical direction, as shown in FIG. 7.

From this state, an operator pulls the process cartridge 17M rightward. Through this action, the opening 83M of the first support part 78M disengages from the base part 126M on the urging member 120RM, and the opening 90M formed in the second support part 85M disengages from the base part 126M on the urging member 120LM, as shown in FIG. 8.

As the process cartridge 17M continues to move rightward, the inner edge of the opening 83M defined in the first support part 78M slides downward and rightward along the sloped surface 128M of the urging member 120RM, and the inner edge of the opening 90M defined in the second support part 85M slides downward and rightward along the sloped surface 128M of the urging member 120LM. Consequently, the process cartridge 17M itself moves diagonally downward and rightward.

As the process cartridge 17M continues to move rightward, the first sloped surface 84M on the first support part 78M contacts the engaging surface 125M on the urging member 120RM, while the second sloped surface 91M on the second support part 85M contacts the engaging surface 125M on the urging member 120LM. At this time, the inner edge of the opening 83M defined in the first support part 78M separates from the sloped surface 128M on the urging member 120RM, and the inner edge of the opening 90M defined in the second support part 85M separates from the sloped surface 128M on the urging member 120LM.

As the process cartridge 17M continues to move rightward, the first sloped surface 84M slides diagonally downward and rightward along the engaging surface 125M formed on the urging member 120RM, and the second sloped surface 91M slides diagonally downward and rightward along the engaging surface 125M formed on the urging member 120LM. Consequently, the process cartridge 17M itself moves diagonally downward and rightward and is placed on the center plate 52. This action interrupts communication between the opening 70M formed in the first conveying tube 77M and the opening 68M formed in the mounting unit 53M.

At this time, the process cartridge 17M is in its second position, as shown in FIG. 8. The process cartridge 17M is configured to move between the first position and the second position by a distance L2 smaller than the distance L1 in the vertical direction.

From this state, the process cartridge 17M is extracted from the main casing 2 through the opening 6 and opening 58.

9. Image-Forming Operation

When the toner cartridges 16Y, 16M, 16C, and 16K and process cartridges 17Y, 17M, 17C, and 17K are mounted in the main casing 2, as shown in FIG. 2, and an image-forming operation is initiated on the printer 1, the charging rollers 25Y, 25M, 25C, and 25K is configured to apply a uniform positive charge to the surfaces of the corresponding photosensitive drums 24Y, 24M, 24C, and 24K, as illustrated in FIG. 1. Subsequently, the scanning unit 15 exposes the surfaces of the photosensitive drums 24Y, 24M, 24C, and 24K by irradiating laser beams with high-speed scanning, thereby forming electrostatic latent images based on image data on the surfaces of the corresponding photosensitive drums 24Y, 24M, 24C, and 24K.

Incidentally, in each of the toner cartridges 16Y, 16M, 16C, and 16K, when the light-receiving element 112 receives light from the corresponding light-emitting element 111 (that is, when the level of toner in the second conveying tube 98 has not yet reached up to a position detectable by the detector 110), the first agitator 141 in each toner cartridge 16 is configured to rotate to convey toner from the corresponding large accommodating chamber 138 into the corresponding small accommodating chamber 139, as illustrated in FIG. 2. The second agitator 142 in the corresponding small accommodating chamber 139 also rotates to introduce toner from the small accommodating chamber 139 into the input tube 66 via the corresponding openings 72 and 68. The toner introduced into the input tube 66 moves through the first conveying tube 77 and second conveying tube 98 of the corresponding process cartridge 17. When the light-receiving element 112 no longer receives light from the corresponding light-emitting element 111 (that is, when a sufficient amount of the toner has been introduced into the second conveying tube 98), the printer 1 stops driving the first agitator 141 and second agitator 142 of the corresponding toner cartridge 16. Thus, the toner can be maintained at a low level in the second conveying tubes 98Y, 98M, 98C, and 98K, and therefore the level of the toner can be prevented from rising higher to reach the openings 70Y, 70M, 70C, and 70K in the first conveying tubes 77Y, 77M, 77M and 77C.

As illustrated in FIG. 1, the unit screws 30Y, 30M, 30C, and 30K subsequently convey the toner from right to left in the developing-unit frames 26Y, 26M, 26C, and 26K while supplying the toner onto the supply rollers 28Y, 28M, 28C, and 28K. The toner supplied to the supply rollers 28Y, 28M, 28C, and 28K is in turn supplied onto the developing rollers 27Y, 27M, 27C, and 27K, at which time the toner is positively tribocharged between the supply rollers 28Y, 28M, 28C, and 28K and the corresponding developing rollers 27Y, 27M, 27C, and 27K.

As the developing rollers 27Y, 27M, 27C, and 27K rotate, the thickness of the toner supplied onto the developing rollers 27Y, 27M, 27C, and 27K is regulated by the thickness-regulating blades 29Y, 29M, 29C, and 29K so that a toner layer of uniform thickness is carried on the surface of each of the developing rollers 27Y, 27M, 27C, and 27K.

The positively charged toner carried on the surfaces of the developing rollers 27Y, 27M, 27C, and 27K is subsequently supplied to the electrostatic latent images formed on the surfaces of the respective photosensitive drums 24Y, 24M, 24C, and 24K as the photosensitive drums 24Y, 24M, 24C, and 24K rotate. In this way, toner images are formed through reverse development on the surfaces of the photosensitive drums 24Y, 24M, 24C, and 24K.

Next, while the intermediate transfer belt 36 circulates, the photosensitive drums 24Y, 24M, 24C, and 24K transfer the toner images in their corresponding colors onto the intermediate transfer belt 36 in a primary transfer process.

In the meantime, the first pick-up roller 12 picks up and separates the sheets accommodated in the first sheet tray 9 and conveys the sheets one at a time and at a prescribed timing along the first sheet-feeding path 181 to the position between the intermediate transfer belt 36 and the secondary transfer roller 32.

As each sheet passes between the intermediate transfer belt 36 and the secondary transfer roller 32, the toner image carried on the intermediate transfer belt 36 is transferred onto the sheet in a secondary transfer process.

Thereafter, heat and pressure are applied to the sheet in the fixing unit 19 as the sheet passes between the heat roller 41 and the pressure roller 42, thereby thermally fixing the toner image to the sheet.

After the toner image has been thermally fixed to the sheet in the fixing unit 19, the sheet is guided by the guide 45 oriented in the discharge position and is discharged into the discharge tray 43.

Here, if sheets have been loaded in the second sheet tray 10, the second pick-up roller 13 picks up and separates the sheets in the second sheet tray 10 and conveys the sheets one at a time and at a prescribed timing along the second sheet-feeding path 182 to the position between the intermediate transfer belt 36 and secondary transfer roller 32.

Further, when images are being formed on both surfaces of the sheet, the sheet is guided along the guide 45 oriented in the reverse position after a toner image has been thermally fixed to one side of the sheet in the fixing unit 19, and the sheet enters between the reversing rollers 44.

By reversing their rotation, the reversing rollers 44 convey the sheet back downward into the main casing 2 along a U-shaped path that guides the sheet back to the position between the intermediate transfer belt 36 and the secondary transfer roller 32 in order that an image can be formed on the back side of the sheet. Once the image has been formed on the back side of the sheet and thermally fixed to the sheet in the fixing unit 19, the sheet is guided along the guide 45, now oriented in the discharging position, and is discharged into the discharge tray 43.

10. Cleaning Operation

In the meantime, the drum cleaning blades 96Y, 96M, 96C, and 96K scrape off waster toner remaining on the corresponding photosensitive drums 24Y, 24M, 24C, and 24K. The waste toner is collected in the drum cleaning frames 95Y, 95M, 95C, and 95K. The drum cleaning screws 97Y, 97M, 97C, and 97K convey this waste toner rightward in the drum cleaning frames 95Y, 95M, 95C, and 95K.

As shown in FIG. 2, the waste toner being conveyed through the drum cleaning frames 95Y, 95M, 95C, and 95K flows into the connector tubes 172Y, 172M, 172C, and 172K through the discharge tubes 100Y, 100M, 100C, and 100K. Thereafter, the conveying screw 164 conveys the waste toner diagonally downward and rearward in the conveying cylindrical part 171 to the third conveying tube 165. The waste toner falls down through the third conveying tube 165 and is collected in the waste toner container 166.

As shown in FIG. 1, the belt-cleaning blade 152 scrapes residual toner off the intermediate transfer belt 36 so that the toner drops into the belt-cleaning frame 151. The belt-cleaning screw 153 then conveys the waste toner rightward in the belt-cleaning frame 151.

The waste toner being conveyed in the belt-cleaning frame 151 flows into the conveying cylindrical part 171 through the first conveying tube 161 shown in FIG. 2. The waste toner is subsequently conveyed diagonally downward and rearward in the conveying cylindrical part 171 by the conveying screw 164 and flows into the third conveying tube 165. The waste toner is discharged from the third conveying tube 165 and collected in the waste toner container 166.

To remove the waste toner container 166 from the main casing 2, the operator places the cover 64 in the open position and pulls the waste toner container 166 out of the main casing 2 through the access opening 63. At this time, the shutter 178 closes the opening 177 formed in the waste toner container 166, and the shutter 176 closes the opening 200 at the bottom end of the third conveying tube 165.

11. Operational and Technical Advantages of the First Embodiment (1) In the printer 1 of the embodiment described above, the toner cartridges 16Y, 16M, 16C, and 16K can be mounted in and removed from the main casing 2 in the left-right direction through the corresponding openings 59Y, 59M, 59C, and 59K, as shown in FIG. 7. Further, the process cartridges 17Y, 17M, 17C, and 17K can be mounted in and removed from the main casing 2 in the left-right direction through the openings 6 and 58, as shown in FIG. 8. Hence, the toner cartridges 16Y, 16M, 16C, and 16K and process cartridges 17Y, 17M, 17C, and 17K can be independently mounted in and removed from the main casing 2 in the left-right direction.

When the process cartridges 17Y, 17M, 17C, and 17K are mounted in the main casing 2, as shown in FIG. 6, the urging members 120RY, 120RM, 120RC and 120RK and the urging members 120LY, 120LM, 120LC, and 120LK urge the corresponding process cartridges 17Y, 17M, 17C, and 17K toward the first positioning part 61 and the second positioning part 62. Thus, the process cartridges 17Y, 17M, 17C, and 17K are positioned such that toner supplied from the toner cartridges 16Y, 16M, 16C, and 16K can be received through the corresponding openings 70Y, 70M, 70C, and 70K. Therefore, the toner supplied from the toner cartridges 16Y, 16M, 16C, and 16K can be reliably supplied to and received in the process cartridges 17Y, 17M, 17C, and 17K.

(2) As shown in FIG. 6, the urging members 120RY, 120RM, 120RC and 120RK and the urging members 120LY, 120LM, 120LC, and 120LK are positioned to the left of the openings 70Y, 70M, 70C, and 70K formed in the first conveying tubes 77Y, 77M, 77C, and 77K. Accordingly, this construction can prevent interference between the urging members 120RY, 120RM, 120RC and 120RK and urging members 120LY, 120LM, 120LC, and 120LK and the openings 70Y, 70M, 70C, and 70K during mounting and removal of the process cartridges 17Y, 17M, 17C, and 17K relative to the main casing 2.

(3) Further, the urging members 120RY, 120RM, 120RC and 120RK are disposed to the right of the first positioning part 61, as shown in FIG. 6. Accordingly, the space in the printer 1 is effectively utilized when laying out the urging members 120RY, 120RM, 120RC and 120RK.

(4) Further, as shown in FIG. 6, the first positioning part 61 and second positioning part 62 are arranged further leftward than the openings 70Y, 70M, 70C, and 70K formed in the first conveying tubes 77Y, 77M, 77C, and 77K. This arrangement can prevent interference between the first positioning part 61 and second positioning part 62 and the openings 70Y, 70M, 70C, and 70K when the process cartridges 17Y, 17M, 17C, and 17K are mounted in or removed from the main casing 2.

(5) As shown in FIG. 3, the process cartridges 17Y, 17M, 17C, and 17K are respectively provided with the drum-unit frames 23Y, 23M, 23C, and 23K and developing-unit frames 26Y, 26M, 26C, and 26K. Further, the openings 70Y, 70M, 70C, and 70K are respectively formed in the drum-unit frames 23Y, 23M, 23C, and 23K. Accordingly, the openings 70Y, 70M, 70C, and 70K can be arranged in fixed positions, even when the developing-unit frames 26Y, 26M, 26C, and 26K pivot relative to the drum-unit frames 23Y, 23M, 23C, and 23K. Thus, the toner supplied from the toner cartridges 16Y, 16M, 16C, and 16K can be reliably received through the openings 70Y, 70M, 70C, and 70K.

(6) As shown in FIG. 3, the first conveying tubes 77Y, 77M, 77C, and 77K are connected to the second conveying tubes 98Y, 98M, 98C, and 98K on the right side of the first side plates 75Y, 75M, 75C, and 75K. In other words, the first conveying tubes 77Y, 77M, 77C, and 77K are connected to the second conveying tubes 98Y, 98M, 98C, and 98K respectively at positions opposite to the second side plates 76Y, 76M, 76C, and 76K with respect to the first side plates 75Y, 75M, 75C, and 75K in the left-right direction. This configuration prevents the need to enlarge the process cartridges 17Y, 17M, 17C, and 17K in the front-rear and vertical directions.

(7) As shown in FIG. 6, the first conveying tubes 77Y, 77M, 77C, and 77K at least partially overlap the corresponding urging members 120RY, 120RM, 120RC and 120RK in a front-rear projection. Accordingly, the space required for arranging the urging members 120RY, 120RM, 120RC and 120RK and the first conveying tubes 77Y, 77M, 77C, and 77K in the printer 1 can be reduced.

(8) As shown in FIG. 3, the developing-unit frames 26Y, 26M, 26C, and 26K can pivot about the rotational shaft 74K relative to the drum-unit frames 23Y, 23M, 23C, and 23K, respectively. Hence, by pivoting the developing-unit frames 26Y, 26M, 26C, and 26K relative to the drum-unit frames 23Y, 23M, 23C, and 23K, the developing-unit frames 26Y, 26M, 26C, and 26K can be separated from the drum-unit frames 23Y, 23M, 23C, and 23K, and the developing rollers 27Y, 27M, 27C, and 27K can be separated from the photosensitive drums 24Y, 24M, 24C, and 24K.

(9) The connectors 99Y, 99M, 99C, and 99K that connect the first conveying tubes 77Y, 77M, 77C, and 77K to the second conveying tubes 98Y, 98M, 98C, and 98K shown in FIG. 3 are formed of an elastic material, and specifically a sponge. Hence, the connectors 99Y, 99M, 99C, and 99K can flex appropriately when the developing-unit frames 26Y, 26M, 26C, and 26K pivot relative to the drum-unit frames 23Y, 23M, 23C, and 23K. Accordingly, the connectors 99Y, 99M, 99C, and 99K can reliably connect the first conveying tubes 77Y, 77M, 77C, and 77K to the corresponding second conveying tubes 98Y, 98M, 98C, and 98K, even when the developing-unit frames 26Y, 26M, 26C, and 26K pivot relative to the drum-unit frames 23Y, 23M, 23C, and 23K.

(10) As shown in FIG. 4B, the printer 1 of the first embodiment is provided with the detectors 110Y, 110M, 110C, and 110K for detecting the quantity of toner in the respective second conveying tubes 98Y, 98M, 98C, and 98K. Hence, the detectors 110Y, 110M, 110C, and 110K can detect whether toner is present in the respective second conveying tubes 98Y, 98M, 98C, and 98K.

(11) As shown in FIG. 5, the urging members 120RY, 120RM, 120RC and 120RK and the urging members 120LY, 120LM, 120LC, and 120LK are respectively provided with the engaging surfaces 125Y, 125M, 125C, and 125K. The engaging surfaces 125Y, 125M, 125C, and 125K slope upward toward the left. Therefore, when the process cartridges 17Y, 17M, 17C, and 17K are mounted in the main casing 2, the first support parts 78Y, 78M, 78C, 78K engage with the engaging surfaces 125Y, 125M, 125C, and 125K of the respective urging members 120RY, 120RM, 120RC and 120RK and the second support parts 85Y, 85M, 85C, and 85K engage with the engaging surfaces 125Y, 125M, 125C, and 125K of the respective urging members 120LY, 120LM, 120LC, and 120LK, and together move the process cartridges 17Y, 17M, 17C, and 17K upward.

Accordingly, the process cartridges 17Y, 17M, 17C, and 17K can be smoothly engaged with the respective urging members 120RY, 120RM, 120RC and 120RK and urging members 120LY, 120LM, 120LC, and 120LK during mounting of the process cartridges 17Y, 17M, 17C, and 17K in the main casing 2.

(12) As shown in FIG. 5, each of the urging members 120RY, 120RM, 120RC and 120RK and urging members 120LY, 120LM, 120LC, and 120LK is provided with respective pivoting parts 121 121Y, 121M, 121C, and 121K; engaging parts 123Y, 123M, 123C, and 123K; and tension springs 124Y, 124M, 124C, and 124K. When the process cartridges 17Y, 17M, 17C, and 17K are mounted in the main casing 2, the tension springs 124Y, 124M, 124C, and 124K of the corresponding urging members 120RY, 120RM, 120RC and 120RK urge the first support parts 78Y, 78M, 78C, 78K upward through the base parts 126Y, 126M, 126C, and 126K of the corresponding urging members 120RY, 120RM, 120RC and 120RK. Similarly, the tension springs 124Y, 124M, 124C, and 124K of the corresponding urging members 120LY, 120LM, 120LC, and 120LK urge the second support parts 85Y, 85M, 85C, and 85K upward through the base parts 126Y, 126M, 126C, and 126K of the corresponding urging members 120LY, 120LM, 120LC, and 120LK. This configuration can reliably urge the process cartridges 17Y, 17M, 17C, and 17K upward.

(13) As shown in FIG. 6, the lower surfaces of the input tubes 66Y, 66M, 66C, 66Y of the respective mounting units 53Y, 53M, 53C, and 53K in which the openings 68Y, 68M, 68C, and 68K are formed slope downward toward the left. As shown in FIG. 3, the top surfaces of the first conveying tubes 77Y, 77M, 77C, and 77K in which the openings 70Y, 70M, 70C, and 70K are formed also slope downward toward the left. Thus, the openings 68Y, 68M, 68C, and 68K can be placed smoothly in communication with the openings 70Y, 70M, 70C, and 70K when the process cartridges 17Y, 17M, 17C, and 17K are mounted in the main casing 2.

Further, the urging members 120RY, 120RM, 120RC and 120RK and urging members 120LY, 120LM, 120LC, and 120LK urge the process cartridges 17Y, 17M, 17C, and 17K toward the first positioning part 61 and second positioning part 62. In this way, the seals 92Y, 92M, 92C, and 92K provided on the first conveying tubes 77Y, 77M, 77C, and 77K are pressed against the corresponding seals 69Y, 69M, 69C, and 69K provided on the input tubes 66Y, 66M, 66C, and 66K. This arrangement improves the tightness of the seal formed between the seals 92Y, 92M, 92C, and 92K and the corresponding seals 69Y, 69M, 69C, and 69K.

(14) As shown in FIG. 6, the openings 102Y, 102M, 102C, and 102K formed in the discharge tubes 100Y, 100M, 100C, and 100K are arranged to the right of the openings 70Y, 70M, 70C, and 70K formed in the first conveying tubes 77Y, 77M, 77C, and 77K. In this way, the openings 102Y, 102M, 102C, and 102K and the openings 70Y, 70M, 70C, and 70K can be arranged with good balance in the main casing 2.

(15) As shown in FIG. 6, the openings 102Y, 102M, 102C, and 102K formed in the discharge tubes 100Y, 100M, 100C, and 100K are arranged to the right of the first positioning part 61. Accordingly, this arrangement prevents interference between the openings 102Y, 102M, 102C, and 102K and the first positioning part 61 when the process cartridges 17Y, 17M, 17C, and 17K are mounted in or removed from the main casing 2.

(16) As shown in FIG. 3, the first sloped surfaces 84Y, 84M, 84C, and 84K formed on the first support parts 78Y, 78M, 78C, 78K in the process cartridges 17Y, 17M, 17C, and 17K are arranged between the corresponding openings 70Y, 70M, 70C, and 70K and openings 102Y, 102M, 102C, and 102K in the front-rear direction. This arrangement reduces the space required in the printer 1 for arranging the openings 70Y, 70M, 70C, and 70K; openings 102Y, 102M, 102C, and 102K; and urging members 120RY, 120RM, 120RC and 120RK.

(17) As shown in FIGS. 6 and 7, the connector tubes 172Y, 172M, 172C, and 172K can be moved between the communication position and the non-communication position. With this configuration, the connector tubes 172Y, 172M, 172C, and 172K can be placed in the non-communication position when the process cartridges 17Y, 17M, 17C, and 17K are being mounted in or removed from the main casing 2, thereby preventing the connector tubes 172Y, 172M, 172C, and 172K from interfering with the process cartridges 17Y, 17M, 17C, and 17K.

(18) As shown in FIGS. 7 and 8, the vertical distance L1 by which the connector tubes 172Y, 172M, 172C, and 172K moves between the communication position and the non-communication position is greater than the vertical distance L2 by which the process cartridges 17Y, 17M, 17C, and 17K move between the first position and the second position. This arrangement can prevent interference between the connector tubes 172Y, 172M, 172C, and 172K and the process cartridges 17Y, 17M, 17C, and 17K by moving the process cartridges 17Y, 17M, 17C, and 17K from their first position to their second position after moving the connector tubes 172Y, 172M, 172C, and 172K from the communication position to the non-communication position.

(19) As shown in FIG. 7, the connector tubes 172Y, 172M, 172C, and 172K are in their communication position when the cover 8 is in its closed position, and the connector tubes 172Y, 172M, 172C, and 172K are in their non-communication position when the cover 8 is in its open position. Accordingly, the connector tubes 172Y, 172M, 172C, and 172K can be reliably placed at the non-communication position when mounting or removing the process cartridges 17Y, 17M, 17C, and 17K relative to the main casing 2.

12. Second Embodiment

Next, a printer 1A according to a second embodiment will be described with reference to FIGS. 9 and 10, wherein like parts and components are designated with the same reference numerals to avoid duplicating description.

In the first embodiment described above, the process cartridges 17Y, 17M, 17C, and 17K are urged toward the first positioning part 61 and second positioning part 62 by the urging members 120RY, 120RM, 120RC and 120RK and urging members 120LY, 120LM, 120LC, and 120LK. In the second embodiment shown in FIG. 9, the main casing 2 is provided with a linkage 250 that can urge the process cartridges 17Y, 17M, 17C, and 17K toward the first positioning part 61 and second positioning part 62.

The linkage 250 specifically includes a plate 251, a first linking member 252, a second linking member 253, a first spring 261, and a second spring 262.

The plate 251 is disposed above the center plate 52. The plate 251 has a flat plate shape that is generally rectangular in a plan view and elongated in the left-right direction. The plate 251 has a right edge engageable with the left surface of the cover 8. The plate 251 has a left edge engageable with the right surface of the second side plate 55. The process cartridges 17Y, 17M, 17C, and 17K are supported on the plate 251.

The first linking member 252 is disposed below a right end portion of the plate 251. The first linking member 252 has a general bar shape, with one end of the first linking member 252 attached to the right end portion of the plate 251 so as to be capable of rotating relative thereto, and the other end attached to a right end portion of the center plate 52 so as to be capable of rotating relative thereto.

The second linking member 253 is disposed below a left end portion of the plate 251. The second linking member 253 has a general bar shape, with one end of the second linking member 253 attached to the left end portion of the plate 251 so as to be capable of rotating relative thereto, and the other end attached to a left end portion of the center plate 52 so as to be capable of rotating relative thereto.

The first spring 261 is disposed above the right end portion of the plate 251. The first spring 261 is configured of a helical spring, with its bottom end engaged in the plate 251.

The second spring 262 is disposed above the left end portion of the plate 251. The second spring 262 is configured of a helical spring, with its bottom end engaged in the plate 251.

When mounted in the main casing 2, the process cartridges 17Y, 17M, 17C, and 17K are positioned above the plate 251. At this time, the right ends of the process cartridges 17Y, 17M, 17C, and 17K are urged toward the first positioning part 61 by the first spring 261, and the left ends of the process cartridges 17Y, 17M, 17C, and 17K are urged toward the second positioning part 62 by the second spring 262.

Figure 10:
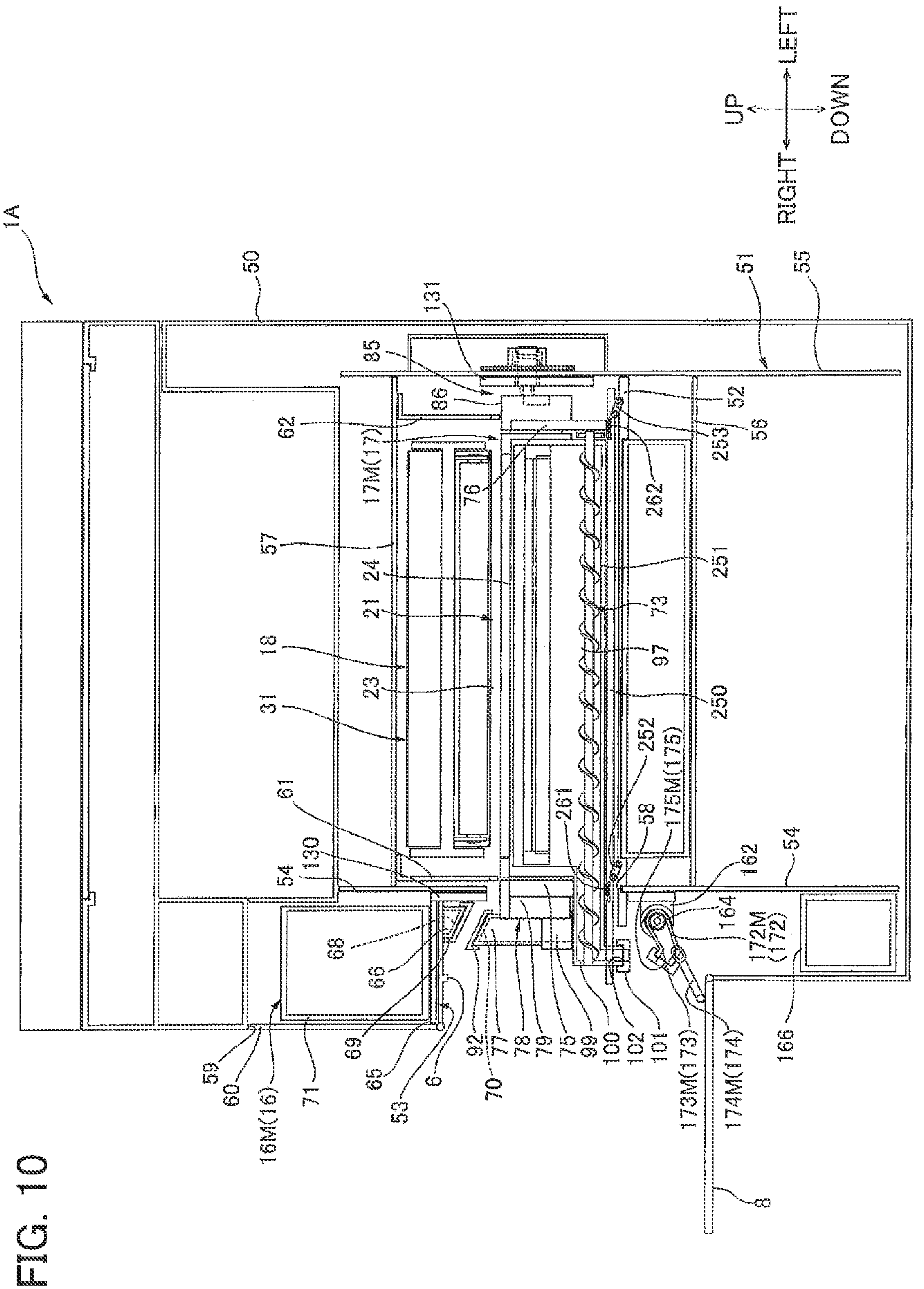
FIG. 10 is a cross-sectional view of the printer according to the second embodiment and taken along the line corresponding to the line B-B of FIG. 1, and showing a state where the process cartridge is at its second position and the connector tube is at the non-communication position.

When the cover 8 is moved to its open position while the process cartridges 17Y, 17M, 17C, and 17K are mounted in the main casing 2, the weight of the process cartridges 17Y, 17M, 17C, and 17K causes the first linking member 252 and second linking member 253 to pivot counterclockwise in FIG. 10 so that the plate 251 moves diagonally downward and rightward. As a result, the process cartridges 17Y, 17M, 17C, and 17K move from their first position to their second position.

Figure 9:
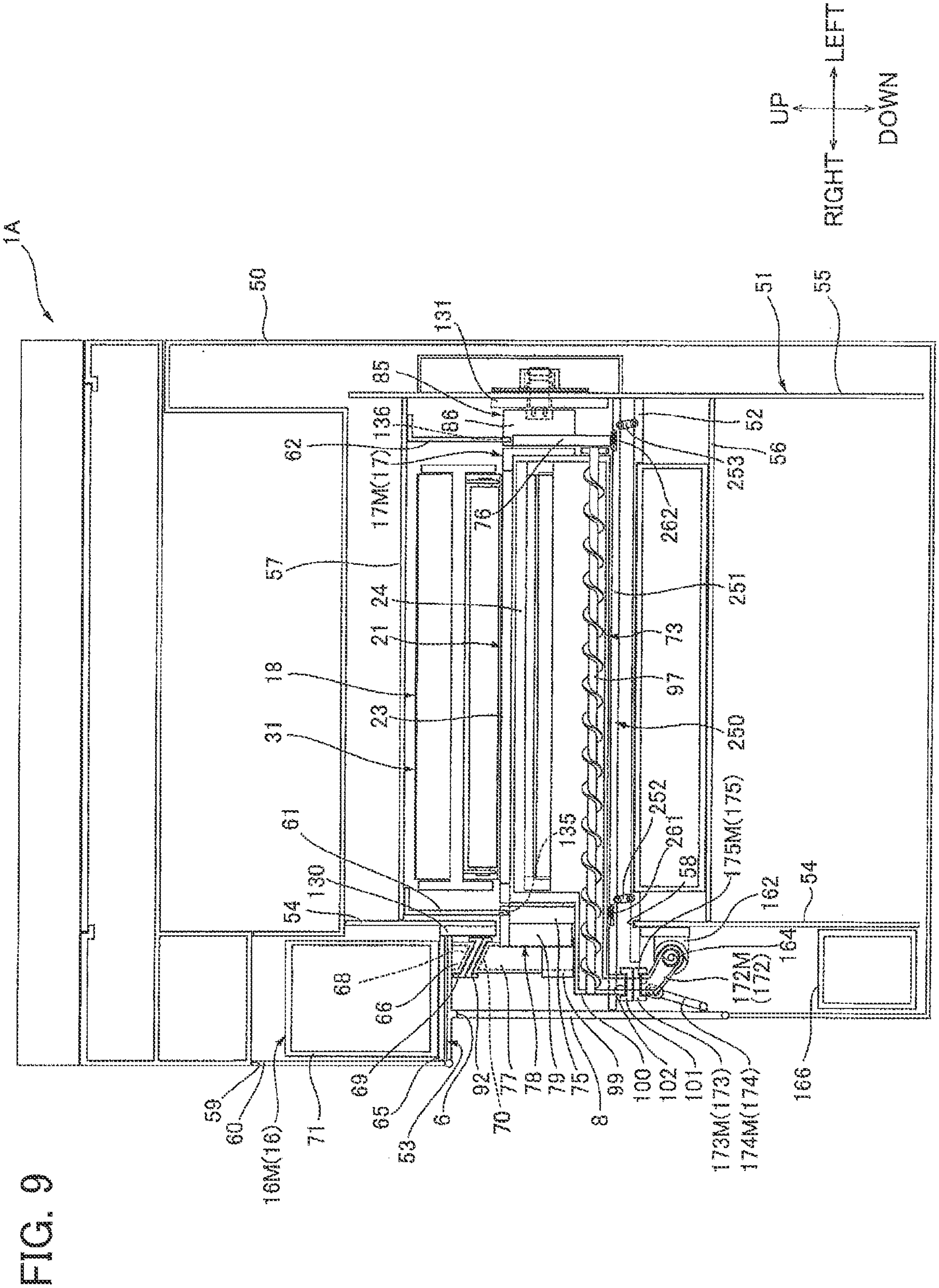
FIG. 9 is a cross-sectional view of a printer according to a second embodiment and taken along a line corresponding to the line B-B of FIG. 1, and showing a state where a process cartridge is at its first position and the connector tube is at the communication position.

Conversely, when the cover 8 is moved from this state to its closed position, the left surface of the cover 8 pushes the right end portion of the plate 251 leftward, as illustrated in FIG. 9. Accordingly, the first linking member 252 and the second linking member 253 pivot clockwise in FIG. 9, and the plate 251 moves diagonally upward and leftward.

The printer 1A according to the second embodiment can obtain the same operational and technical advantages as those described in the first embodiment.

Further, with the printer 1A according to the second embodiment, the linkage 250 can associate the opening and closing operations of the cover 8 with the operations for moving the process cartridges 17Y, 17M, 17C, and 17K between the first position and second position, as shown in FIGS. 9 and 10. Accordingly, the process cartridges 17Y, 17M, 17C, and 17K can be reliably placed in their second position when the cover 8 is placed in its open position.

13. Variations of the Embodiments

In the embodiments described above, the printer 1(1A) is provided with the drum cleaning blades 96Y, 96M, 96C, and 96K as an example of the cleaning member. However, in place of the drum cleaning blades 96Y, 96M, 96C, and 96K, the printer 1(1A) may be provided with cleaning rollers or cleaning brushes that contact the photosensitive drums 24Y, 24M, 24C, and 24K.

While the description has been made in detail with reference to specific embodiments thereof, it would be apparent to those skilled in the art that various changes and modifications may be made therein without departing from the scope of the above described embodiments.

What is claimed is:

1. An image-forming apparatus comprising:
- a main casing comprising an outer frame and an inner frame disposed inside the outer frame,
  - the outer frame comprising:
    - a first wall having a first opening; and
    - a second wall spaced apart from the first wall in a first direction, and
  - the inner frame comprising:
    - a first side plate having a second opening; and
    - a second side plate spaced apart from the first side plate in the first direction, the first side plate being disposed between the first wall and the second side plate in the first direction, the outer frame and the inner frame providing a space therebetween in the first direction;
- a toner cartridge comprising a cartridge frame configured to store toner therein; and
- a process cartridge comprising:
  - a photosensitive drum;
  - a developing roller configured to develop a toner image on the photosensitive drum by supplying the toner to the photosensitive drum; and
  - a conveying tube configured to receive the toner from the toner cartridge,
- wherein the process cartridge is movable in the first direction from a first position where the photosensitive drum is located inside the inner frame and the conveying tube protrudes in the space between the outer frame and the inner frame toward a second position where a part of the photosensitive drum is exposed to an outside of the inner frame,
- wherein the cartridge frame is in communication with the conveying tube when the process cartridge is at the first position and the toner cartridge is attached to the main casing, and
- wherein the photosensitive drum passes through the second opening when the process cartridge moves from the first position toward the second position in the first direction.

2. The image-forming apparatus according to claim 1, wherein the toner cartridge is detachably attached to the space between the outer frame and the inner frame.

3. The image-forming apparatus according to claim 1, wherein the main casing further comprises a first door configured to cover the first opening.

4. The image-forming apparatus according to claim 1, wherein the first wall further has a third opening, and wherein the toner cartridge is detachably attached to the main casing through the third opening.

5. The image-forming apparatus according to claim 4, wherein the main casing further comprises a second door configured to cover the third opening.

6. The image-forming apparatus according to claim 1, further comprising:
- a waste toner container configured to store waste toner, the waste toner container being disposed between the outer frame and the inner frame.

7. The image-forming apparatus according to claim 6, wherein the outer frame further comprises a third wall having a fourth opening, the third wall connecting the first wall and the second wall, and wherein the waste toner container is detachable from the main casing through the fourth opening.

8. The image-forming apparatus according to claim 1, wherein the process cartridge further comprises:

a drum unit rotatably supporting the photosensitive drum; and a developing unit rotatably supporting the developing roller.

9. The image-forming apparatus according to claim 1, further comprising:

an input tube configured to convey the toner from the toner cartridge to the conveying tube of the process cartridge, the input tube being disposed in the space between the outer frame and the inner frame.

10. The image-forming apparatus according to claim 9, further comprising a seal formed of an elastic material, wherein the seal fills a gap between the input tube and the conveying tube.

* * * * *